United States Patent
Block

(10) Patent No.: US 7,200,852 B1
(45) Date of Patent: *Apr. 3, 2007

(54) METHOD AND APPARATUS FOR INFORMATION LABELING AND CONTROL

(76) Inventor: Robert S. Block, 13044 Mindanao Way #5, Marina Del Rey, CA (US) 90292

( * ) Notice: This patent issued on a continued prosecution application filed under 37 CFR 1.53(d), and is subject to the twenty year patent term provisions of 35 U.S.C. 154 (a)(2).

Subject to any disclaimer, the term of this patent is extended or adjusted under 35 U.S.C. 154(b) by 0 days.

(21) Appl. No.: 08/697,542

(22) Filed: Aug. 27, 1996

Related U.S. Application Data

(63) Continuation-in-part of application No. 08/576,486, filed on Dec. 21, 1995, now Pat. No. 6,675,384.

(51) Int. Cl.
*H04N 7/16* (2006.01)

(52) U.S. Cl. .......................... 725/28; 725/34

(58) Field of Classification Search ............... 348/460, 348/5.5, 6, 906, 515; 725/25, 26, 27–29, 725/30, 31; *H04N 7/00*
See application file for complete search history.

(56) References Cited

U.S. PATENT DOCUMENTS

| | | | |
|---|---|---|---|
| 3,824,332 A | | 7/1974 | Horowitz |
| 4,225,884 A | | 9/1980 | Block et al. |
| 4,410,911 A | | 10/1983 | Field et al. |
| 4,528,589 A | | 7/1985 | Block et al. |
| 4,554,584 A | | 11/1985 | Elam et al. |
| 4,605,964 A | | 8/1986 | Chard |
| 4,768,229 A | * | 8/1988 | Bejamin et al. ............... 380/20 |
| 4,888,796 A | | 12/1989 | Olivo, Jr. |
| 4,930,160 A | * | 5/1990 | Vogel .......................... 380/23 |
| 4,999,701 A | | 3/1991 | Cavallerano et al. ......... 358/12 |
| 5,101,432 A | | 3/1992 | Webb |
| 5,130,815 A | | 7/1992 | Silverman et al. |
| 5,168,372 A | * | 12/1992 | Sweetser ..................... 358/349 |

(Continued)

FOREIGN PATENT DOCUMENTS

FR          2 678 091          12/1992

(Continued)

OTHER PUBLICATIONS

*Expanded XDS Program Rating Spec.* (EIA Draft Nov. 6, 1995).

(Continued)

*Primary Examiner*—Scott E. Beliveau
(74) *Attorney, Agent, or Firm*—Buchanan Ingersoll & Rooney PC

(57) ABSTRACT

A method and apparatus for information labeling and control includes central station equipment which combines a program signal with content labels which separately and continuously identify the audio, video, and data content of the program signal, and user station equipment which generates a local content label identifying program material which is acceptable to the user. By comparing the two labels the user station equipment can block or substitute alternative audio, video, or data for offensive portions of a program signal received through a transmission or stored for playback on various media such as video tapes, audio tapes, CDs, computer disks, optical storage media, and video game cartridges. Exemplary embodiments of the invention also relate to a method and apparatus for creating the local content label.

2 Claims, 14 Drawing Sheets

U.S. PATENT DOCUMENTS

| | | | | |
|---|---|---|---|---|
| 5,172,111 | A | * | 12/1992 | Olivo, Jr. ............... 340/825.31 |
| 5,195,135 | A | | 3/1993 | Palmer |
| 5,317,399 | A | | 5/1994 | Satake et al. ............... 348/571 |
| 5,335,277 | A | | 8/1994 | Harvey et al. ............... 380/20 |
| 5,382,983 | A | * | 1/1995 | Kwoh et al. ............... 348/5.5 |
| 5,387,942 | A | * | 2/1995 | Lemelson ............... 348/474 |
| 5,485,518 | A | * | 1/1996 | Hunter et al. ............... 340/5.5 |
| 5,524,195 | A | * | 6/1996 | Clanton, III et al. ....... 395/155 |
| 5,550,575 | A | * | 8/1996 | West et al. ............... 348/5.5 |
| 5,583,560 | A | * | 12/1996 | Florin et al. ............... 725/40 |
| 5,583,576 | A | | 12/1996 | Perlman et al. |
| 5,589,945 | A | | 12/1996 | Abecassis ............... 386/83 |
| 5,710,815 | A | * | 1/1998 | Ming et al. ............... 380/241 |
| 5,721,583 | A | * | 2/1998 | Harada et al. ............... 725/24 |
| 5,758,257 | A | * | 5/1998 | Herz et al. ............... 725/116 |
| 5,758,259 | A | * | 5/1998 | Lawler ............... 725/46 |
| 5,774,170 | A | * | 6/1998 | Hite et al. ............... 725/34 |

FOREIGN PATENT DOCUMENTS

| | | | | |
|---|---|---|---|---|
| FR | | 2678091 | * 12/1992 | ............... 348/460 |
| GB | | 2 209 417 A | 5/1989 | |
| WO | | 83/02208 | 6/1983 | |
| WO | | WO 83/02208 | 6/1983 | |

OTHER PUBLICATIONS

*Recommended Practice for Line 21 Data Service,* EIA Standard, (EIA-608), Sep. 1994.

*Decoder Recommended Practices for the Program Rating Extended Data Services* (XDS) *Packet,* (EIA Draft Nov. 6, 1995).

Edmund L. Andrews, *A Chip that Allows Parents to Censor TV Sex and Violence,* New York Times, Jul. 18, 1993.

Courtenay M. Smith, *V-Chip Technology,* TV TechCheck, National Association of Broadcasters, Jul. 17, 1995.

* cited by examiner

METHOD AND APPARATUS FOR INFORMATION LABELING AND CONTROL

RELATED APPLICATION

This application is a continuation-in-part application of application U.S. Ser. No. 08/576,486, filed Dec. 21, 1995 now U.S. Pat. No. 6,675,384.

BACKGROUND

The present invention relates generally to information processing and more particularly to a system and method for information labeling and control in which a user can control access to information based on its content.

The rapid growth of the communications industry has brought about significant changes in society. The instantaneous access to countless information sources through television networks, home video, computers, and communication networks raises significant social, philosophical, ethical, legal, technical, and competitive issues. For example, a large number of TV programs which are easily available to the public are considered by many people to be harmful or offensive to them or their children. This is also true of certain information available on public computer networks. And while information providers enjoy a large degree of freedom in distributing their products, the only protection users who receive such information have is their right to turn it off or not turn it on. With such a large amount and wide variety of programs and information available, even these alternatives are more difficult than they first appear. These simple choices are not the only possible alternatives, and may not be acceptable alternatives, unless consumers of information can make informed decisions.

Labels have often been provided to allow users to understand the nature and content of products prior to their use. Food and cigarettes, for example, are often labeled to allow users to make informed choices without the need to first use the product. Medicines are not only labeled, they are often fitted with child-proof caps. This allows parents to make informed decisions and provides a means to help parents prevent unauthorized use by their children.

Until recently, information available to the general public has not presented a significant threat to users. For example, access to harmful or objectionable information through television networks has been relatively limited until recently. With the rapid growth of the communications industry, however, potentially harmful and/or offensive information is much more widely available.

Unlike the food and medicine industries, the communications industry has provided few means of labeling or restricting access to its products, due in part to the policy of favoring free speech. One such method, however, is described in U.S. Pat. No. 4,528,589, entitled "Method and System for Subscription Television Billing and Access. "In this system, a transmitted television program signal includes a code which identifies the category in which the program has been rated. The television system at home allows the user to set parameters which define an acceptable rating of programs for home viewing. Based on a comparison of the two settings, the system either denies or allows access to the program.

While the above system provides one method of restricting access to television programs containing offensive material, many other alternatives are possible to provide users with enhanced control over access to information.

SUMMARY

It is an object of the invention, therefore, to provide a method and apparatus for information labeling and control in which a user can control access to information based on its content.

It is a further object of the invention to provide a method and apparatus for information labeling and control so that a user can avoid access to portions of a program, film, file, CD-ROM, World Wide Web ("WWW") page etc., which are offensive or undesirable to the user, or in the case of a parent, the parent can prevent access to the information by children.

It is a further object of the invention to provide a method and apparatus for separately and continuously labeling and controlling audio, video, and data signals. According to one embodiment of the invention, the audio and video of television programs can be independently evaluated and separate content rating labels can be provided for each. The content rating label may change dynamically to reflect the changing content of the program. A control mechanism at the user site continuously compares the user setting with the transmitted content rating label and blocks the audio or video whenever the transmitted content rating label exceeds the limit set by the user.

It is a further object of the invention to provide a method and apparatus for information labeling and control in which a substitute program signal is presented to a user instead of the offensive or undesirable portions of a program.

An exemplary apparatus for information labeling and control comprises first means for receiving a program signal and a program information label, second means for generating a local information label which is related to the program information label, and third means for blocking portions of the program signal based on the program information label and the local information label. The apparatus may also comprise means for generating the program information labels and means for providing a substitute program signal when the regular program signal is blocked.

An exemplary method for information labeling and control comprises the steps of receiving a plurality of information units comprising a program signal, receiving a plurality of program information labels, each program information label being associated with a content of one of the information units, generating a local information label associated with a content of the program signal, and allowing or denying access to the information units based on the information labels and the local information label. Exemplary embodiments of the invention also relate to methods and systems for creating or modifying the local information label.

The present invention thus provides several advantages to information producers and users. By continuously and dynamically electronically labeling programs and providing a means for users to enter their requirements, users gain by being able to make informed choices, producers and distributors gain by having a greater opportunity to provide what customers want, and society gains by maintaining freedom of choice and supporting informed decisions.

The present invention may be implemented in any environment in which a program signal is presented to a user, for example in a broadcast, cable, or satellite television system, on home video cassettes, compact discs, video discs, audio tapes, computer discs, video game cartridges, electronic books, Internet World Wide Web pages, computer networks, and other multimedia or communication systems. The system and method of the present invention may be built into new systems, integrated into existing systems, or provided by an external stand-alone unit.

BRIEF DESCRIPTION OF THE DRAWINGS

The foregoing and other objects, features and advantages of the present invention will be more readily understood upon reading the following detailed description in conjunction with the drawings in which.

DETAILED DESCRIPTION

Figure 1:
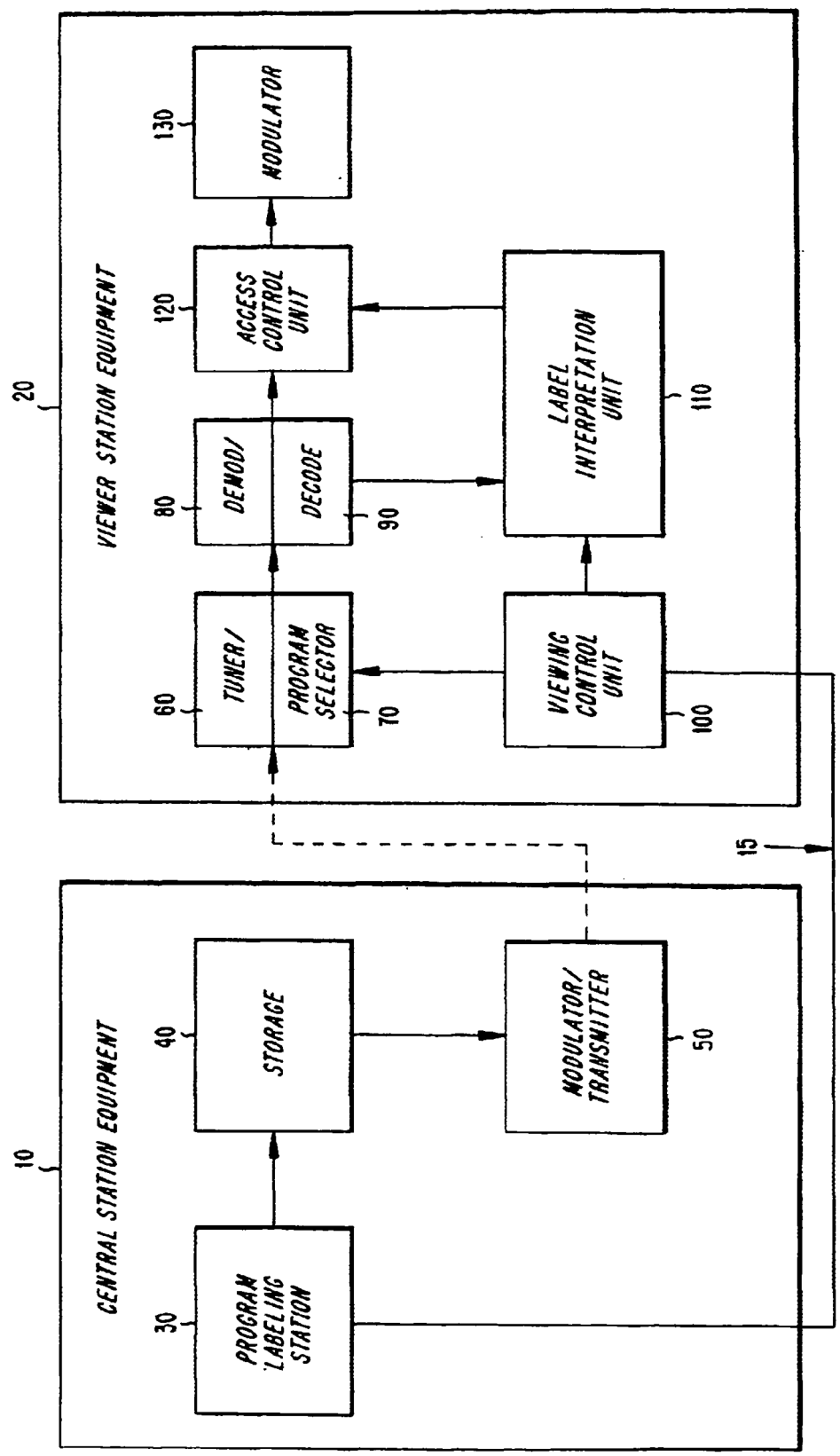
FIG. 1 is a functional block diagram of an exemplary apparatus for information labeling and control.

Referring now to FIG. 1, an exemplary information labeling and control apparatus adapted for television viewing will be described. It should be understood that application of the present invention is not limited to television systems, and that it may be applied to any system of communication in which information is delivered to a user. In an exemplary embodiment for television, the apparatus comprises central station equipment 10 which supplies program signals to viewer station equipment 20 at each of the viewer stations. As will be described hereinafter in greater detail, the program signal includes audio and video signals as well as various synchronizing signals and labels. The audio and video signals can be generated from a conventional source such as television camera equipment. The program signal is supplied to the viewers either by conventional broadcast or cable techniques and can be transmitted with a suitable conventional transmitter. The program signal can be either scrambled (e.g., encrypted) or not scrambled (in the clear), and can be an analog signal, such as in the NTSC, PAL, or SECAM format, or a digital signal.

As shown in FIG. 1, the central station equipment 10 may include a program labeling station 30 for generating or receiving the program signals and for generating the various synchronizing signals and labels, a storage unit 40 for storing the program signal after the labels have been generated and combined with the program signal, and a modulator and transmitter 50 for transmitting the program signal to the viewer station equipment 20. The viewer station equipment 20 may include a tuner 60 or program selector 70 for receiving the program signal, a demodulator 80 and/or decoder 90 for demodulating and decoding the received program signal, a viewing control unit 100 which allows a viewer to control access to the received program signal by generating various local labels, a label interpretation unit 110 which evaluates and compares the locally generated and transmitted labels, an access control unit 120 which controls access to the program signal, and a modulator 130 for modulating the access controlled program signal onto a suitable carrier frequency prior to transmission to the TV antenna input.

Although FIG. 1 shows a system in which the program signals and labels are transmitted to the viewer station equipment 20 by the modulator/transmitter 50, those skilled in the art will recognize that the present invention may be utilized in a system in which the central station functions to combine the program signals with the labels and to store the combined signal on a local storage device such as a compact disc, video disc, computer disc, audio tape, video tape, or video game cartridge. In such system, the user would receive the program signals and labels from the local storage device rather than from the modulator transmitter 50 of the central station equipment 10.

Figure 2:
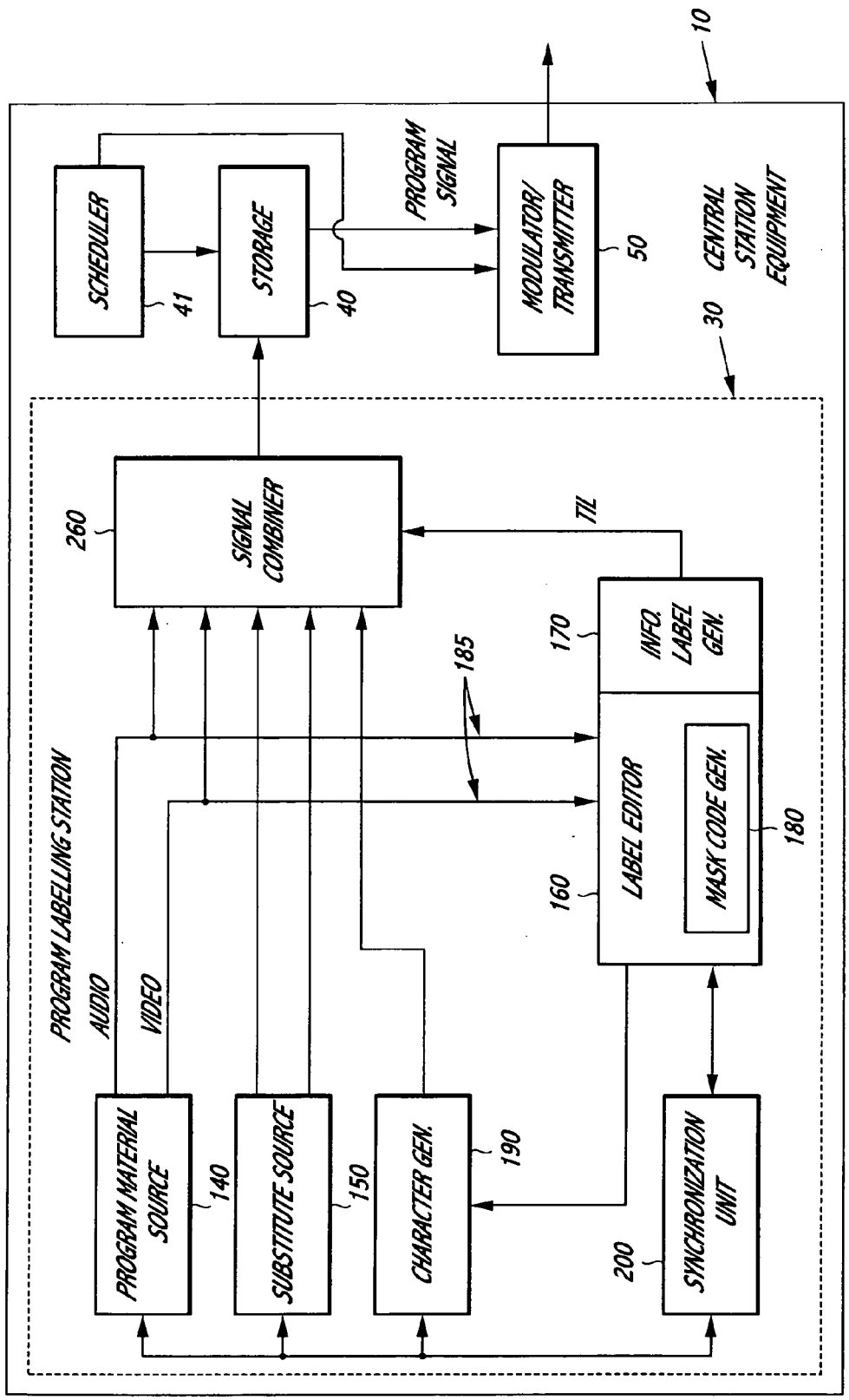
FIG. 2 is a functional block diagram of the central station equipment of FIG. 1 according to an exemplary embodiment of the invention.

The central station equipment 10 is shown in greater detail in FIG. 2. As shown, an exemplary program labeling station 30 includes a program material source 140 which can be any conventional generator of the audio and video program signals. A substitute source generator 150 may also be included for generating substitute audio or video program signals, for example to provide substitute signals during offensive or undesired portions of the program signal.

A label editor 160, which includes an information label generator 170 can be provided to generate a variety of labels or codes for labeling the program signals. The label editor 160 may comprise a video screen and a speaker for presenting to a viewer/editor the program signals received through transmission lines 185 from the program material source 140. The viewer/editor views the program signals and can command the label editor 160 to generate appropriate labels with the information label generator 170, for example according to the instantaneous content of the program signals. The label editor 160 may also comprise a mask code generator 180 for generating a mask code which is transmitted with the program signals for masking an offensive or undesirable portion of the video signal. A character generator 190 may, optionally be provided to generate characters to be transmitted to the viewer station equipment 20 for display in accordance with a command signal sent by the label editor 160.

According to an exemplary embodiment of the invention, the information label generator 170, synchronized with the video signal, provides a transmitted information label TIL for transmission with the program signals. The transmitted information label TIL may be used to identify and characterize the content of the audio and video program signals. The TIL may be inserted into the video information stream, for example in the vertical retrace interval or at any other convenient location in an analog transmission. In a digital transmission, the TIL information can be inserted into the encoded information stream at any appropriate location. Depending on the amount of information contained in the TIL, the TIL may be inserted in an analog or digital video stream, for example on one or more lines, if necessary. Alternately, the TIL can be split over a number of frames.

A synchronization unit 200 controls the state of the program material source 140, the substitute source 150, and the character generator 190 so that the viewer/editor using the label editor 160 can control, e.g., stop, slow, or reverse, the program signals in order to facilitate the generation of the labels at the appropriate places in the program signal. The synchronization unit 200 also detects the appropriate synchronization pulse in the video signal, e.g., the vertical sync pulses during the vertical retrace interval, and supplies the sync pulse to the label editor 160 in order to allow the information label generator 170 to insert the transmitted information label TIL in the correct place in the video stream.

The information label generator 170 receives the sync signal from the synchronization unit 200 and generates the transmitted information label TIL, for example during the vertical retrace interval. If the present invention is implemented with a digital signal, the TIL may be inserted into any appropriate location in the digital video stream. The TIL is preferably transmitted on the same carrier frequency or channel as the video signal ("in band"), but may also be transmitted on a different channel or frequency ("out of band").

Figure 3:
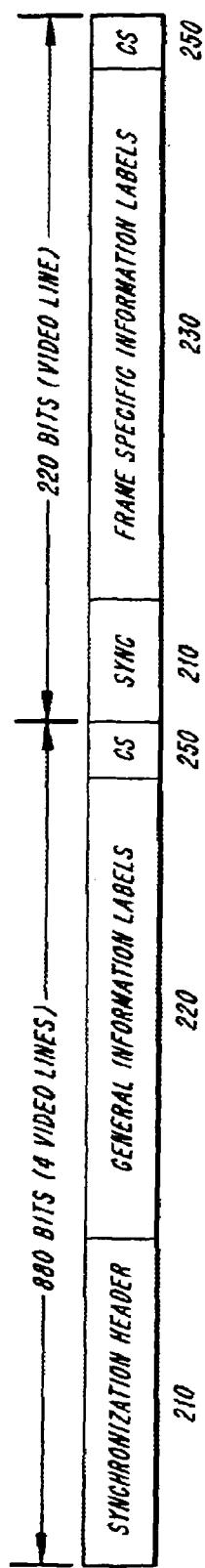
FIG. 3 is a diagram of an exemplary information format for a transmitted information label TIL.

FIG. 3 shows a diagram of an exemplary information format for a transmitted information label TIL which may include a suitable allocation for a synchronization header 210, general information labels 220, frame specific information labels 230, and a checksum 250. The transmitted information label TIL is preferably a digital code with a designated number of bits for each field within the structure; however, it will be understood that any well known coding technique, such as the tone burst technique described in U.S. Pat. No. 3,824,332, entitled "Pay Television System", which is hereby incorporated by reference, may be utilized. Although the embodiment of the TIL shown in FIG. 3 contains both general information labels 220 and frame specific information labels 230, other embodiments of the invention may contain either frame specific information labels or general information labels, but need not contain both.

The synchronization header 210 is provided to synchronize the TIL with a conventional data receiver 85 in the demodulator 80. The general information labels 220 contain information on the overall program signal. The frame specific information labels 230 may comprise labels which rate the instantaneous content of a frame of information. The checksum 250 may be a conventional 16 bit cyclic redundancy check for error checking.

The fields within the transmitted information label TIL may include any desired codes for labeling and controlling the program signals transmitted to the viewer station equipment 20. According to one embodiment, the transmitted information label TIL contains frame specific information labels 230 comprising an audio category label and a video category label which rate the content of the audio and video program signals in a particular frame. The audio and video category labels can each comprise one or more bits, and preferably comprise three or more bits so that each category label can define several levels or values of program content. The audio and video category labels can thus provide an instantaneous label of the content of the audio and video program signals in a television program. For example, the values 1 through 4 of the video category label can represent that the video signal is rated "G," "PG," "R," or "NC-17" at a particular point in time during the program:

1: Suitable for viewing by the public in general ("G");
2: Subject matter requiring parental guidance ("PG");
3: Restricted subject matter ("R"); and
4: NC-17-rated material ("NC-17").

A viewer/editor, using the label editor 160, can generate audio and video category labels which independently identify the instantaneous content of the audio and video signals. The category labels can be configured to accommodate additional or alternative values, such as "PG-13", for example.

A number of additional category labels may be allocated to more specifically label the content of the audio and video signals. Table 1 provides an example of the structure of an exemplary transmitted information label TIL which includes both general information labels 220 and frame specific information labels 230. The general information labels 220 contain information on the overall content of the program signals, as will be described below in greater detail. The frame specific information labels 230, as shown in the frame specific information labels portion of Table 1, may include a synchronization header, a frame rating label which rates the overall content of an individual frame, a frame theme label which categorizes the frame as having a particular theme such as comedy, tragedy, news, love story, adventure, etc., and labels which individually rate a level of violence content, sexual content, and/or foul language content of the audio and video signals of a particular frame of the program signal. The terms sex and violence are used in their broadest definition. They relate to all sexual or violent acts or allusions whether they be physical, emotional, psychological, intellectual, or racial.

Table 2 shows an example of the content of the transmitted information label TIL according to the structure shown in FIG. 1. In the frame specific information labels in Table 2, a frame rating label of 0/(Unrestricted) is shown as well as a frame theme label specifying that the program is a news program. A video sexual content label is allocated to label a sexual content rating of the video signal from VS-0 to VS-7 (VS-7 signifying most sexually explicit, for example), and an audio sexual content label is allocated to label a sexual content rating of the audio signal from AS-0 to AS-7. Analogous audio and video violence content labels are provided, as well as a foul language content label for rating the instantaneous content of the dialog in a program from L-0 through L-7.

TABLE 1

| Example Transmitted Information Label Structure | Size | Comments |
|---|---|---|
| GENERAL INFORMATION LABELS | | |
| Sync | 16 | Synchronization Header |
| Name | 320 | Text field containing name |
| ID | 64 | Identification number |
| Rating | 4 | Overall rating of Information |
| Theme | 80 | Text field describing Theme of Information e.g. News |
| Description Text | 320 | Text Field containing descriptive text. This may change with time. |
| Rating Profile | | Obtained from aggregate of frame labels |
| % Sexual Content | | Structure describing percentage of level of sexual content of information |

TABLE 1-continued

| Example Transmitted Information Label Structure | | Size | Comments |
|---|---|---|---|
| | level 0 | 4 | No sexual content |
| | level 1 | 4 | Innuendo |
| | level 2 | 4 | Partial Nudity |
| | level 3 | 4 | Full frontal Nudity |
| | level 4 | 4 | Explicit |
| % Violent Content | | | Structure describing percentage of level of violent content of information |
| | level 0 | 4 | No violent content |
| | level 1 | 4 | |
| | level 2 | 4 | |
| | level 3 | 4 | |
| | level 4 | 4 | very violent content |
| % Foul Language | | | Structure describing percentage of level of bad language and sound content of information |
| | level 0 | 4 | no foul language |
| | level 1 | 4 | |
| | level 2 | 4 | |
| | level 3 | 4 | |
| | level 4 | 4 | very foul language |
| Checksum | | 16 | |
| Total General Information Label Size | | 880 | |
| FRAME SPECIFIC INFORMATION LABELS | | | |
| Sync | | 16 | Synchronization Header |
| Frame Rating | | 4 | Rating of Individual frame |
| Frame Theme | | 80 | Theme for Frame e.g. Comedy |
| Video Sexual Content level | | 3 | Sexual content level of frame |
| Audio Sexual Content level | | 3 | Sexual content level audio within frame |
| Video Violent Content level | | 3 | Violent content level of frame |
| Audio Violent Content Level | | 3 | Violent content level audio within frame |
| Foul Language Content level | | 3 | Foul Language content level of frame |
| Audio and Video Access Processing Instructions | | | Instruction opcodes to provide information on how to process frames which exceed the LIL. |
| Video Opcode | | 48 | Instructional Opcode for processing of video signals |
| parameters | | | parameters associated with Opcode |
| Audio Opcode | | 32 | Instructional Opcode for processing of audio signals |
| parameters | | | parameters associated with Opcode |
| Padding | | 9 | |
| Checksum | | 16 | |
| Total Frame Label Size | | 220 | |

TABLE 2

| Example Transmitted Information Label | | |
|---|---|---|
| GENERAL INFORMATION LABELS | | |
| Sync | | 101010101010101 |
| Name | | The News Tonight |
| ID | | 12345678 |
| Rating | | 2 (PG) |
| Theme | | news |
| Text | | Dissent in Congress |
| Rating Profile | | |
| % Sexual Content | | |
| level 0; No sexual content | | 16 |
| level 1;Innuendo | | 0 |
| level 2; Partial Nudity | | 0 |
| level 3; Full frontalNudity | | 0 |
| level 4; Explicit | | 0 |
| % Violent Content | | |
| level 0 | | 15 |
| level 1 | | 1 |
| level 2 | | 0 |
| level 3 | | 0 |
| level 4 | | 0 |
| % Foul Language level 0 | | 14 |
| level 1 | | 1 |
| level 2 | | 1 |
| level 3 | | 0 |
| level 4 | | 0 |
| Checksum | | 1011 0101 0010 0111 |
| FRAME SPECIFIC INFORMATION LABELS | | |
| Sync | | 101010101010101 |
| Frame Rating | | 0(Unrestricted) |
| Frame Theme | | news |
| Video Sexual Content level | | 0 |
| Audio Sexual Content level | | 0 |
| Video Violent Content level | | 0 |
| Audio Violent Content level | | 1 |
| Language Content level | | 1 |
| Audio and Video Access Processing Instructions | | |
| Video Opcode | | Mask |
| parameters | | 25,100–330,400 |
| Audio Opcode | | bleep from line x to y |
| parameters | | 10, 525 |
| Padding | | 0000 0000 0000 |
| Checksum | | 0101 1101 0000 0101 |

As will be appreciated by those skilled in the art, any other desired frame specific information labels may be included in the transmitted information label TIL in accordance with the needs of the user. For example, "How To" programs can be labeled with descriptive text as being appropriate for expert or novice users, so that the user can be informed of and control the level of sophistication of the program. Programs that teach values to children can be labeled with descriptive text as to which value is being promoted so that parents can control and foster values they want their children to believe in. In other embodiments of the invention in which the program signal comprises a data signal, the TIL may include a data category label to characterize the content of the data.

Tables 1 and 2 also show that the frame specific information labels in the TIL preferably contain audio and video access processing instructions which comprise various codes for instructing the access control unit 120 in the viewer station equipment 20 as to how to process the incoming signals. For example, the audio and video access processing instructions may instruct the access control unit 120 to mask certain portions of the video signal or "bleep out" certain portions of the audio signal when the video category label or the audio category label are greater than the user desires. As shown in Tables 1 and 2, the audio and video access processing instructions may contain a video "opcode" or instruction code with video parameters and an audio opcode with audio parameters. The video opcode may contain, for example, a suitable code which instructs the access control unit 120 in the viewer station equipment 20 to mask certain portions of a video frame when the video signal is offensive. The video parameters provide the shape and coordinates of the mask for a particular frame. The audio opcode may contain a code which instructs the access control unit 120 in the viewer station equipment 20 to "bleep out" the audio signal for a certain duration when the audio signal is unacceptable. The audio parameters provide the start and end points of the substitute "bleep" signal. Other examples of video opcodes are as follows:

RectMask x,y u,v rectangular mask with start co-ordinates x,y and stop coordinates u,v BlurMask x,y u,v rectangular blurring mask with start co-ordinates x,y and stop co-ordinates u,v CircleMask x,y,r Circular mask with center co-ordinates x,y and radius r pixels Freeze frame Display previous frame Substitute ch,n Switch to substitute information stream on channel ch for next frame, switch back after the nth frame. This may be time or frequency division multiplexed.

Other examples of audio opcodes are as follows:

Bleep x,f,n Switch to tone generator with frequency f, at line x, for n lines

Substitute ch,x,n Substitute audio from channel ch at line x for n lines, where ch may be a virtual channel number which identifies the location of the substitute audio stream.

The general information labels 220 of the transmitted information label TIL will now be described. As shown in the general information portion of Tables 1 and 2, exemplary general information labels 220 may include a synchronization header, a name label comprising a text field containing a name of the program, (e.g. "The News Tonight"), a program ID label for uniquely identifying the program, a rating label which contains an overall rating of the information or program, (e.g. "PG"), a theme label comprising a text field describing a theme of the overall information or program such as news, comedy, tragedy, etc., a textual label which may be used for transmitting descriptive text with the program signals, and rating profile labels. As will be appreciated by those skilled in the art, many of the labels mentioned above may be utilized both in the frame specific information labels 230 and the general information labels 220.

The rating profile labels can be provided to assist the user in determining whether to view a particular program. The rating profile labels, as shown in Tables 1 and 2, may contain data relating to the percentage of time during the program that the program signal contains different levels of sexual material, violent material, or foul language. This data may be obtained, for example, by totaling the amount of time during a program that the frame specific information labels for each category (e.g. audio violence, video violence, audio sexual content, video sexual content, foul language) are rated at each level (e.g. levels 0–4). The rating profile labels may contain data, for example, which indicate that for 25 percent of the program, the audio signal is rated at level 2 for foul language or that for 20 percent of the program, the video signal is rated at level 3 for sexual content.

The rating profile labels may also contain data which characterize the content of the overall program signal, without distinguishing between audio and video. As shown in Tables 1 and 2, the rating profile labels may indicate the percentage of time that the overall program signal (e.g., either the audio signal, video signal, or both) is rated at each level (e.g. 0–4) for each category (e.g. sexual content, violence, foul language).

The rating profile labels may also contain data relating to the percentage of time during the program that the overall program signal or an individual audio or video signal is rated at each conventional rating such as "G", "PG", "R", or "NC-17". For example, the rating profile labels may indicate that a video signal for a program is rated "G" for 75 percent of the program, "PG" for 23 percent of the program, "R" for 2 percent of the program, and "NC-17" for none of the program. This data would indicate, therefore, that if the portions of the video signal rated above "PG", which would be translated to a rating profile label, were blocked, the program could be viewed without significant interruptions (2%), but that if portions of the video signal rated above "G" were blocked, the viewer would experience significant interruptions (25%).

The viewer station equipment 20 preferably includes a character generator (see FIGS. 9 and 10) in the access control unit 120 which generates characters to display on the viewer's screen a table of the information contained in the rating profile, as well as any information contained in the other transmitted category labels in the TIL, if desired. This advantageous feature allows a user to make informed viewing decisions based on the transmitted information labels. For example, the user can estimate the amount of offensive material contained in a program as well as the amount of time that a program signal would be blocked.

As described above, the transmitted information label TIL may include a suitable number of bits in the general information labels 220 allocated for "description text" which contains a textual description relating to the program signals, such as a textual description of the content of the audio and video signals. The description text may be displayed by a character generator in the viewer station equipment 20 to display, for example, a textual description of the violent scenes in a film, or reasons why the film was rated as "NC-17" during certain portions. Or, the description text may contain a message that certain portions of the program have been rated "R" due to obscene language, but not obscene video. Such information thus allows the user to make an informed decision as to whether to view a program without first being exposed to the program.

According to a further embodiment of the invention, the description text may also contain information on consumer products shown or described in the program signal. For example, the source of products or services shown in a program can be transmitted in the description text and displayed on the viewer's screen. In this way, when a viewer sees or hears about a product he or she likes in a program, the viewer can obtain information on how to purchase the product through the display of the description text on the viewer screen. Clothing, appliances, and musical recordings are examples of products for which a viewer can obtain purchasing information. According to this embodiment, the description text may include a phone number, a price, or any other desired information on the product or service which enables a viewer to purchase the product.

The description text can be adapted to transmit many other types of textual information. For example, when the program is a sporting event, the description text may be adapted to display on the viewer's screen the statistics of a team or particular player.

The program ID label shown in the general information portion of Table 1 can be added in the central station equipment 10 to identify a program for billing purposes, as described in U.S. Pat. No. 4,528,589, entitled "Method and System for Subscription Television Billing and Access", which is hereby incorporated by reference. The program ID label can comprise any suitable number of bits which would enable the program to be uniquely identified. If scrambling is implemented, a scramble code may be provided by a scramble code generator in the central station equipment 10 along with the transmitted information label TIL for transmission with the program signal. If the program signals are scrambled prior to transmission, the scramble code can be combined with the transmitted information label TIL and the program video signal, as is described in the above referenced U.S. Pat. No. 4,528,589.

An advantage of providing the viewer with the capability of displaying the labels in the TIL on the viewer's screen is that the viewer will learn how various types of programs are labeled. With the character generator in the access control unit 120, any of the various labels described above can be displayed so that the viewer can view the labels as the program is being viewed. In this way, the viewer will become familiar with the types of program material which is rated at a particular level such as "PG" or "R", or which is characterized as a comedy or as an expert "How To" program. The audio and video access processing instructions may contain a designated number of bits which instruct the access control unit 120 to display the transmitted labels on the viewer screen as they are received if commanded by the viewer.

Figure 4:
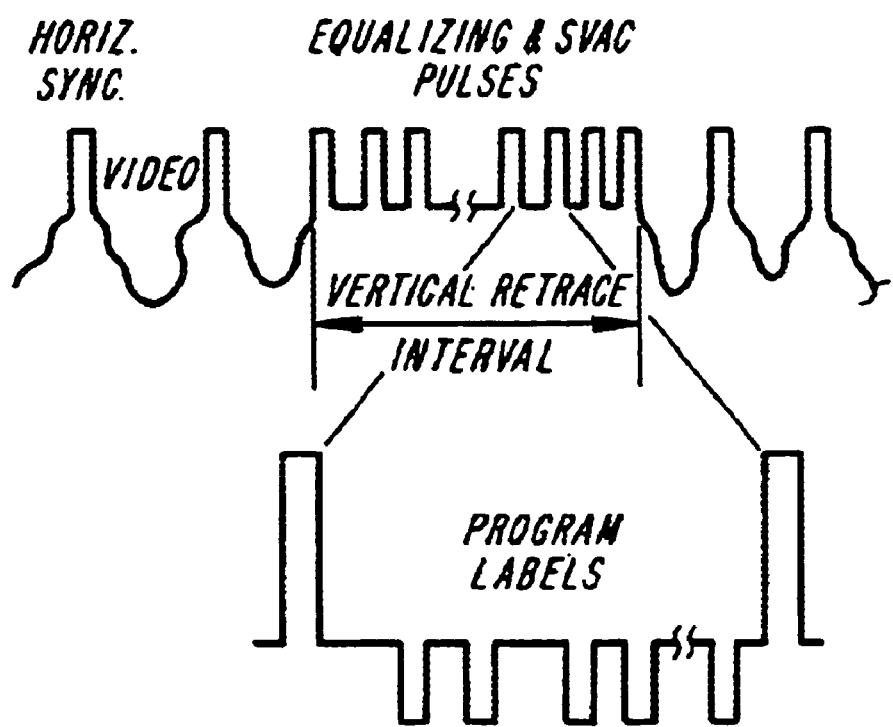
FIG. 4 is a signal diagram illustrating an exemplary form of the video portion of the program signal with program labels as utilized in the system of FIG. 1.

Referring again to FIG. 2, the program signal, the transmitted information label TIL, and any other labels and substitute program signals are supplied to a signal combiner 260. In an NTSC, PAL, or SECAM transmission, for example, the signal combiner 260 receives the program signals and label signals and combines these signals in a conventional manner to produce a signal such as that illustrated in FIG. 4. As shown in FIG. 4, the successive horizontal lines of an analog video signal are conventionally separated by horizontal synchronization pulses, and each frame of the video signal is separated by a vertical retrace interval or vertical synchronization signal. During the vertical retrace interval, various equalizing and synchronization pulses are provided, and it is in this interval that the transmitted information label TIL and other labels are preferably combined with the transmitted information signal. These labels are preferably encoded in a digital form as illustrated in FIG. 4 although any well known coding technique, such as the tone burst technique described in U.S. Pat. No. 3,824,332, may be utilized. Each program that is transmitted may thus be identified, characterized, and described by placing the transmitted information label TIL and other labels in the video signal during the vertical retrace interval, for example, or, if implemented in a digital system, at any convenient location in the digital video stream.

The combined signal is then transmitted to a storage unit 40, such as a VCR, which stores the combined signal so that copies of the program can be made which include the various labels and access processing instructions generated with the label editor 160. Copies of the program can be stored on conventional media such as a compact disc, video disc, audio tape, video tape, video game cartridge, etc. and distributed to users. In a television system, the combined signal is applied to the modulator and transmitter 50 for modulation onto a suitable carrier wave for either broadcast or cable transmission, for example.

Figure 5:
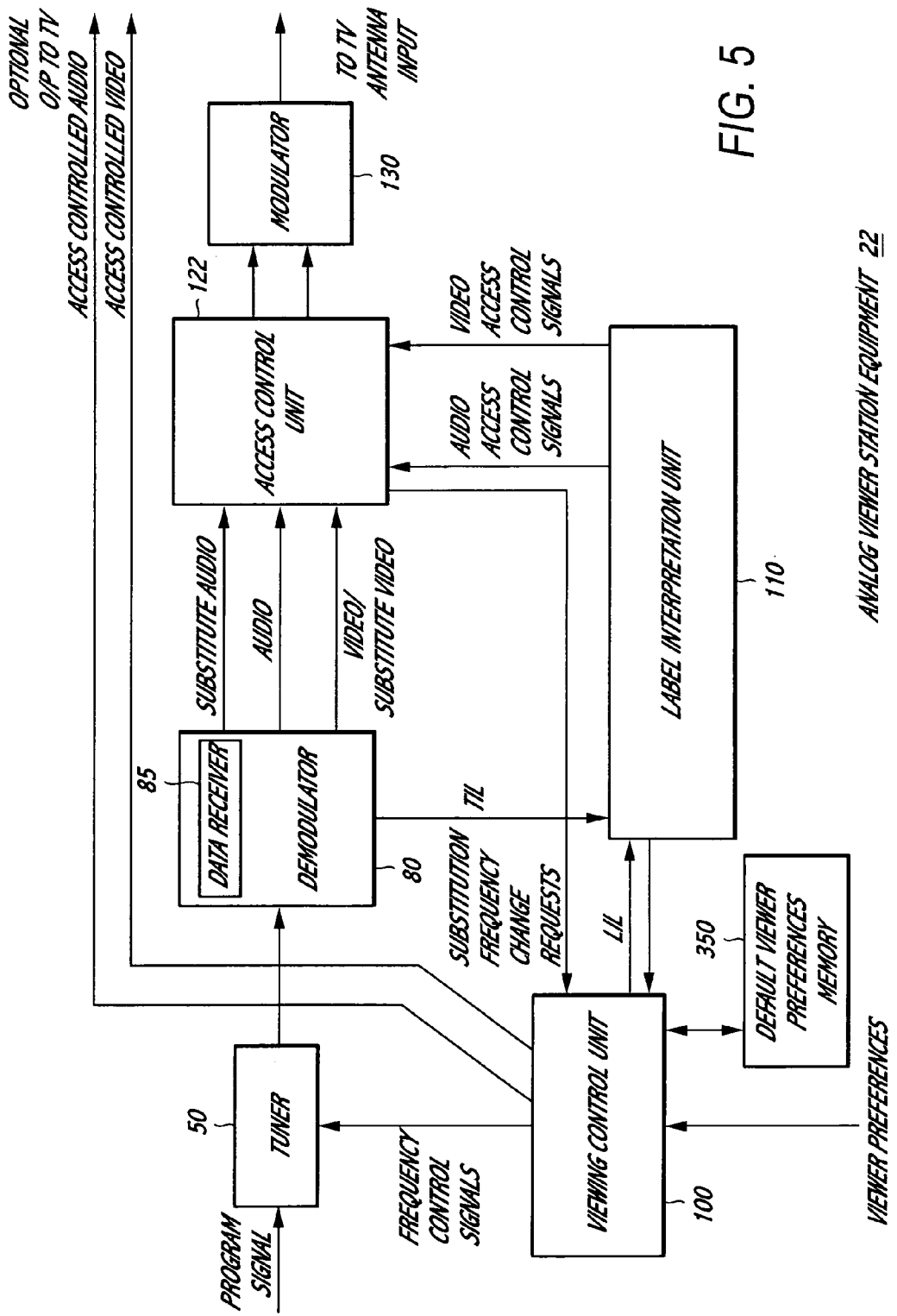
FIG. 5 is an exemplary analog version of the viewer station equipment shown in FIG. 1.
Figure 6:
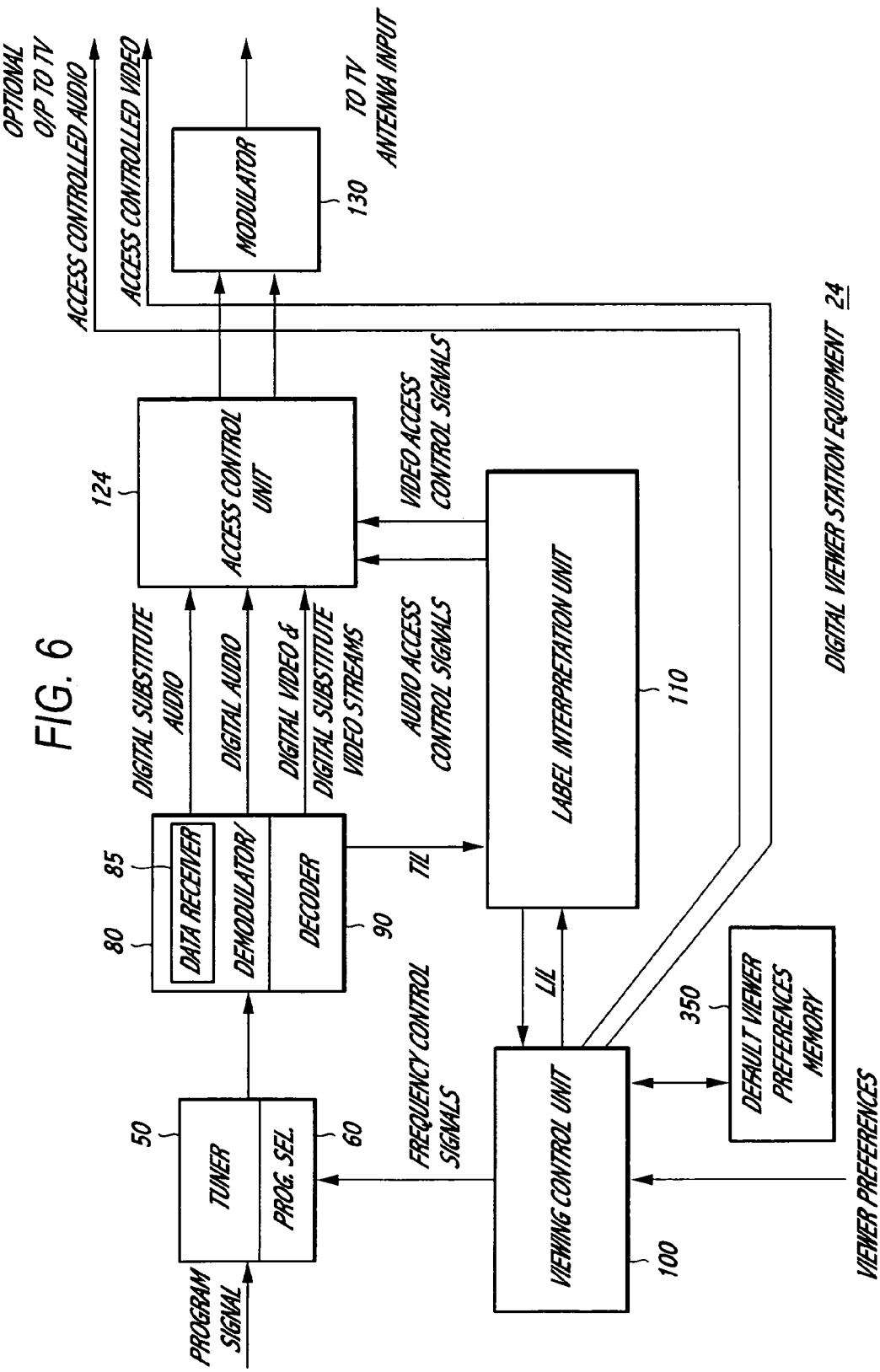
FIG. 6 is an exemplary digital version of the viewer station equipment shown in FIG. 1.

The program signal as well as any substitute program signals transmitted by the central station equipment 10 are received by a tuner 60, or in the case of a digital transmission a program selector 70 which may include a tuner, at the viewer station equipment 20. FIGS. 5 and 6 show exemplary analog viewer station equipment 22 and digital viewer station equipment 24, respectively. In the analog viewer station equipment 22 a conventional tuner 50 is provided for tuning to a desired channel frequency, while the digital viewer station 24 may also include a program selector 60, as more than one channel may be received on a single frequency. A viewing control unit 100 is provided to allow a viewer to select a desired program signal for viewing. Control of the tuner 50 or program selector 60, and thus selection of a particular carrier frequency or program, may be accomplished in a conventional manner by a remote control device or by a control knob on the viewing control unit 100.

The appropriate received signals are then supplied by the tuner 50 or program selector 60 to a conventional demodulator 80 in the analog viewer station equipment 22 or a conventional demodulator 80 and decoder 90 in the digital viewer station equipment 24. The demodulator/decoder 80/90 of the digital viewer station equipment demodulates and decodes the program signals to supply the digital audio, digital substitute audio, digital video, and digital substitute video signals to a digital access control unit 124. The demodulator 80 of the analog viewer station equipment 22 demodulates the programs signals to supply analog signals to an analog access control unit 122.

The video signal also contains the transmitted information label TIL and other labels in addition to video information. The transmitted labels are sent to the label interpretation unit 110 by the demodulator. The label interpretation unit 110 detects the information label TIL in the received video signal as well as other codes such as scramble codes, if appropriate.

Figure 7:
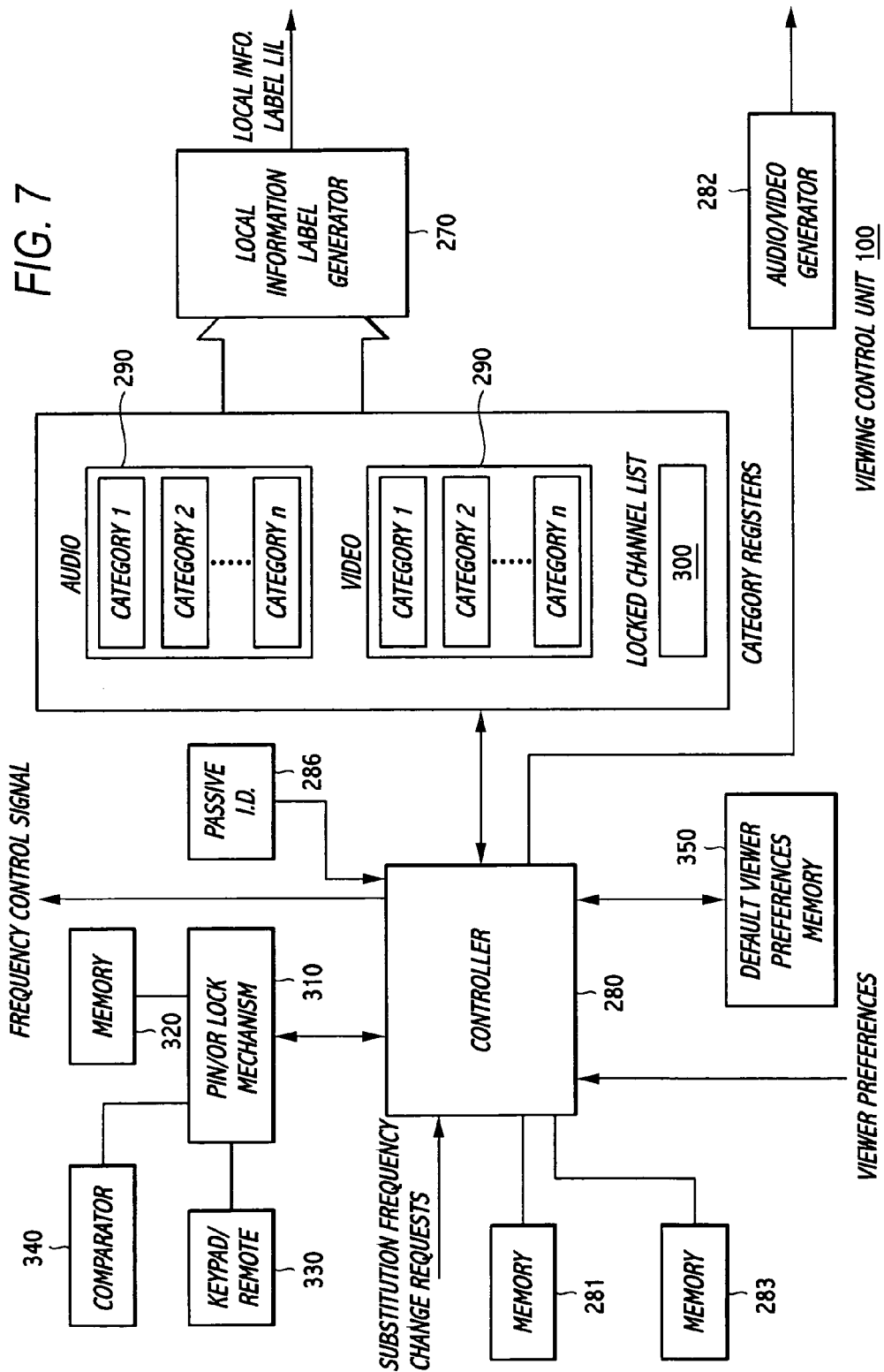
FIG. 7 is an exemplary embodiment of the viewing control unit shown in FIG. 1.

The viewing control unit 100, in addition to providing a signal instructing the tuner 50 or channel selector 60 as to which program to select, also includes a local information label generator 270, as shown in FIG. 7, for generating a local information label LIL to control access to the selected program signals. The local information label LIL includes local category labels which are preferably analogous in format to the transmitted category labels in the transmitted information label TIL shown in FIG. 3. For example, the local information label LIL may include an audio category label and video category label which are analogous to the audio and video category labels in the TIL. Or, the LIL may include a video violence content label which is analogous to the video violence content label of the TIL. The local category labels are set by the user and can define the type and extent of access to the received program signals.

As with the transmitted category labels, the different values of the local category labels such as 1, 2, 3, and 4 can represent classifications of the content of the audio and video portions of the programs such as "G", "PG", "R", and "NC-17", respectively. As with the transmitted category labels in the TIL, additional local category labels can also be included in the LIL, such as for audio violence, audio sexual content, video violence, video sexual content, and foul language. Local category labels specifying acceptable types of stories, acceptable values, acceptable data, or any other desired category, can also be generated and set independently. Thus, a user who considers violence, but not sexual program material, offensive, can set the local audio and video violence category labels at a low violence rating such as "AV-2" and "VV-2" and can set the local audio and video category labels for sexual content at a higher rating, such as "AS-6" and "VS-6". Moreover, the audio and video category labels can be set independently so that a user who is more offended by violent video than violent audio may set the local video violence category label higher than the local audio violence category label. Of course, the number and type of categories may be designed as desired, so that various embodiments of the invention can provide enormous flexibility in shaping the type of information which is accessible to a user. The local information label generator 270 combines the local category labels set by the user into a local information label LIL which is transmitted to the label interpretation unit 110.

The local information label generator 270 can generate a "local rating profile label" which is analogous to the transmitted rating profile label in the TIL. As described above, the transmitted rating profile label may contain information as to the percentage of time during a program that the overall program signal or individual program signals are rated at a certain level such as "PG" or "R". The local rating profile label preferably contains a suitable number of bits which allow a viewer to specify a maximum allowable percentage of time during a program that the program can be rated above a locally specified rating, such as "PG". The local rating profile label can also be configured to specify a maximum allowable percentage of time during a program that the individual program signals can be rated above a locally specified rating, such as AV-6, VV-7, AS-4, VS-3, or L-2. In this way, the viewer can limit with particularity the amount of objectionable or undesirable material in the program signals.

If a program contains more than the predetermined amount of objectionable material, the viewer may wish to deny access to the program completely, rather than view the program with numerous interruptions. The local rating profile label thus preferably includes a "full/partial blocking" label which allows a user to choose between viewing the program with interruptions (partial blocking) no matter how many, or blocking the program entirely if the percentage of the program containing offensive material is greater than the specified percentage (full blocking). For example, if 25 percent of the transmitted audio signal is rated above the locally chosen rating of "G", the user may choose with the "full/partial blocking" label to deny access to the program completely, rather than view the program with significant interruptions to the audio signal. The viewer may thus input to the viewing control unit 100 via remote control the various tolerable percentages for each local category, e.g., overall program, audio, and video, and the value of the full/partial blocking label. If the user specifies in the local rating profile label, for example, that the maximum allowable time percentage above the "G" rating for the overall program is 25 percent and chooses the "full blocking" option, and the transmitted rating profile label in the TIL indicates that 27 percent of the transmitted information is rated higher than "G", the program will be blocked in its entirety. This feature enables a user to avoid the situation in which a program is frequently interrupted. Alternatively, the user may set the "full/partial blocking" label on "partial" so that the program is viewed but with interruptions. As will be described in greater detail below, blocking can be implemented by a variety of methods, such as not tuning to the requested channel, not descrambling the requested channel if it is scrambled, tuning to an alternative channel, or displaying an information screen and no audio instead of the requested channel picture and audio.

As shown in FIG. 7, the viewing control unit 100 may include a controller 280 which controls the generation of the local information label LIL. The viewing control unit 100 may also include plurality of category registers 290 for storing the local information label settings, e.g., the values selected by the viewer for the local audio, video, and rating profile labels. A register 300 may also be provided to store a locked channel list. The locked channel list 300 is accessible to the controller 280, which can deny access to any channels in the locked channel list 300 by sending the appropriate frequency control signals to the tuner 50 or program selector 60. A viewer would typically include in the locked channel list channels which contain a large amount of objectionable material, such as a sexually explicit channel or a horror movie channel.

The viewing control unit 100 can be used to supervise the content of incoming program signals and thus preferably includes a lock mechanism 310 for preventing the local information label LIL from being changed except with a personal identification number (PIN) or combination or physical key. According to one embodiment, the viewing control unit 100 includes a memory 320 for storing a master combination and an operating combination. The operating combination can be keyed in by a parent with a keypad 330 or remote control device to change the local audio and video category labels, for example. A comparator 340 in the viewing control unit 100 compares the operating combination stored in the memory 320 with the combination entered via the keypad 330, and if they are equal, enables the local information label LIL to be changed. Knowledge of the master combination allows a user to change the operating combination stored in the memory 320. The master combination can be kept in a safe place by parents so that it can be used to change the operating combination in the event that the operating combination is lost.

According to another exemplary method, the master combination can be retained by the manufacturer, and the operating combination can be changed by knowledge of the operating combination. Initially, the operating combination can be set to 0000, for example. If the operating combination is forgotten, parents may call the manufacturer who can provide instructions as to how to reset the operating combination to 0000. In order to maintain the security of the reset procedure, the key strokes necessary to reset the operating combination to 0000 preferably change each time the master combination is reset.

According to a further embodiment, the lock mechanism 310 can be a physical lock and key, for example made of metal or plastic. By inserting the key into the lock, parents can reset the operating combination to 0000.

The lock mechanism 310 thus preferably allows a user to change or input the local information label LIL only after entering the appropriate combination or PIN via the remote control. After keying in the correct PIN, the user, according to an exemplary embodiment next presses a specified button on the remote control to access the audio category labels, and increments or decrements the values with the audio volume control buttons, for example. The video category labels may be accessed with a different button and changed, for example, with the channel selector on the remote control. Other labels may be accessed and changed in a similar manner.

A memory 350, which may be a non-volatile memory, can be included in the viewing control unit 100 which contains default settings for the local information label LIL and locked channel list. The manufacturer may set default settings which may be reset by users and which would control access to the program signals after a power outage or before the user has stored the desired local labels in the viewing control unit registers 290 and 300. The default settings may be reset by a user with a remote control in a manner similar to the setting of the local information label LIL. The user may input default settings which are stored in the memory 350. The memory 350 preferably includes registers to store default settings for different times during a day. For example, the user may input a first group of default settings which are higher in the daytime hours when children are in school, lower in the late afternoon and evening when children watch TV, and higher again in the late evening when the children are asleep. The controller 280 may include a timer for determining when each set of default settings is active. As with the manufacturer-provided default settings, the user programmed default settings are preferably overridden by the local category labels. The controller 280 may be programmed to first look to the local user programmed labels, and if they are not available, to the default settings. The default labels or the user programmed labels stored in the registers 290 are output to the local information label generator 270 which generates the local information label LIL for transmission to the label interpretation unit 110.

The viewing control unit 100, if implemented with a billing system, may include additional controls to provide appropriate signals which indicate that the viewer has selected a program for viewing and has thus assumed the obligation to pay for that program. An example of such a billing system is provided in the above referenced U.S. Pat. No. 4,528,589.

Figure 8:
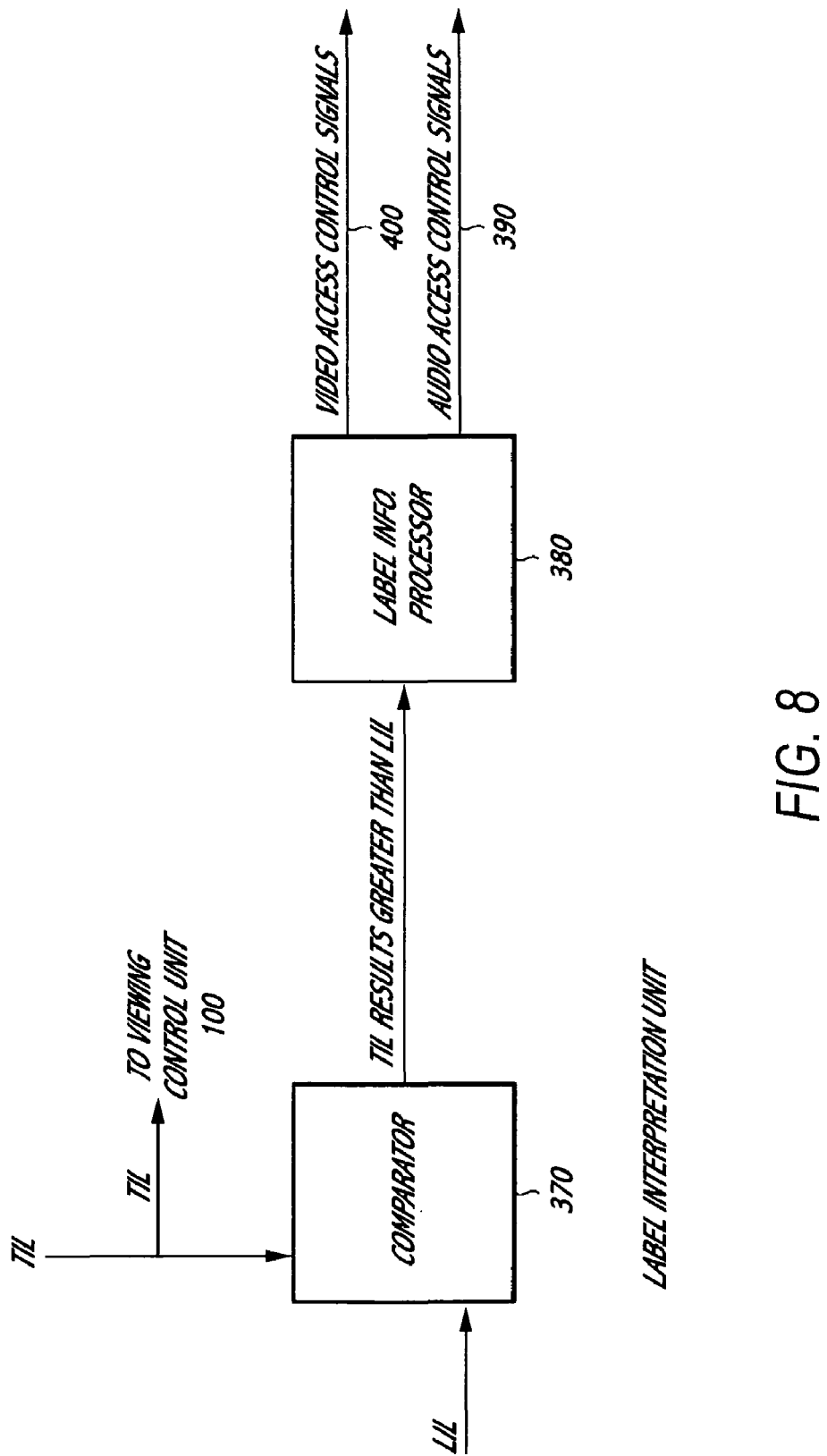
FIG. 8 is an exemplary embodiment of the label interpretation unit shown in FIG. 1.

Referring back to FIGS. 5 and 6, the local information label LIL generated by the viewing control unit 100 is transmitted to a label interpretation unit 110, which also receives the instantaneous transmitted category labels in the transmitted information label TIL for the program being viewed from the video signal output from the demodulator. As shown in detail in FIG. 8, the label interpretation unit 110 may include a comparator 370 which compares the transmitted information label TIL with the local information label LIL generated by the viewing control unit 100. The comparator 370 compares the locally generated audio and video category labels, for example, with the transmitted audio and video category labels, and generates a signal indicating whether the transmitted category labels are greater than the local category labels, in which case the program signals are blocked or modified.

The label information processor 380 receives the various category labels from the TIL and LIL and access processing instructions from the TIL as well as the output from the comparator 370 and generates appropriate audio and video access control signals 390 and 400. The comparator 370 looks at the received TIL data and compares it with the LIL data. In cases where the data fields of the TIL exceed the setting of the LIL, the TIL is output to the label information processor 380. The label information processor 380 extracts from the data structure the audio and video access control signals. These are then passed to the access control unit 120.

By way of example, if the local foul language label is set at 3, and the transmitted foul language label is 2, the label interpretation unit 110 will generate an audio access control signal 390 which instructs the access control unit 120 to allow the audio program signal to be transmitted the viewer.

If the local video sexual content label is set at 2, and the transmitted video sexual content label is 3, the label interpretation unit 110 will generate a video access control signal 400 which instructs the access control unit 120 to modify or block the video signal before transmission to the viewer. The label interpretation unit 110, according to an exemplary embodiment, may thus allow the user to access program signals which are labeled with a transmitted category label which is less than or equal to the corresponding local category label. Access decisions such as this are preferably controlled with the audio and video access processing instructions in the TIL.

Figure 9:
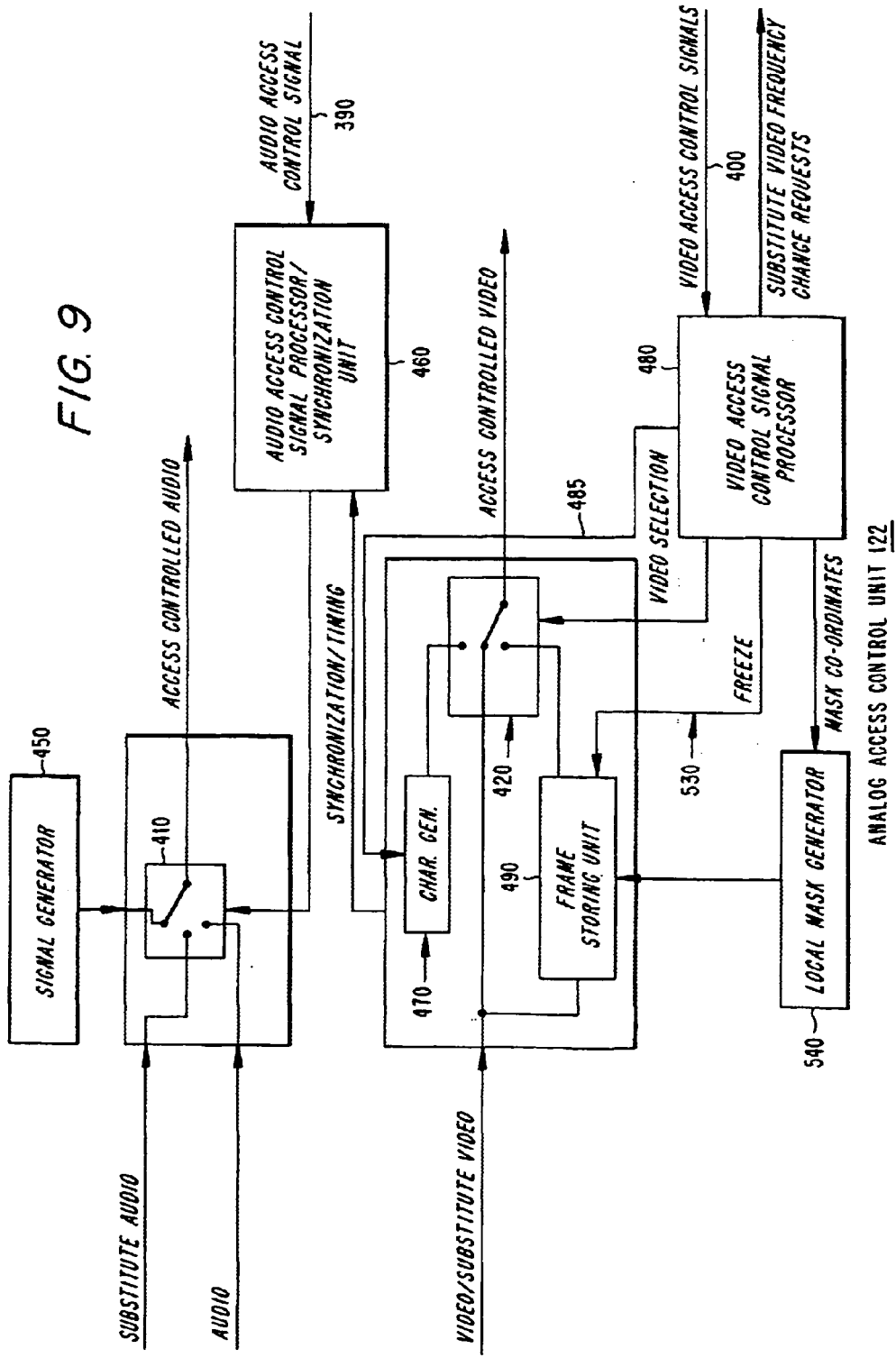
FIG. 9 is an exemplary analog version of the access control unit shown in FIG. 1.
Figure 10:
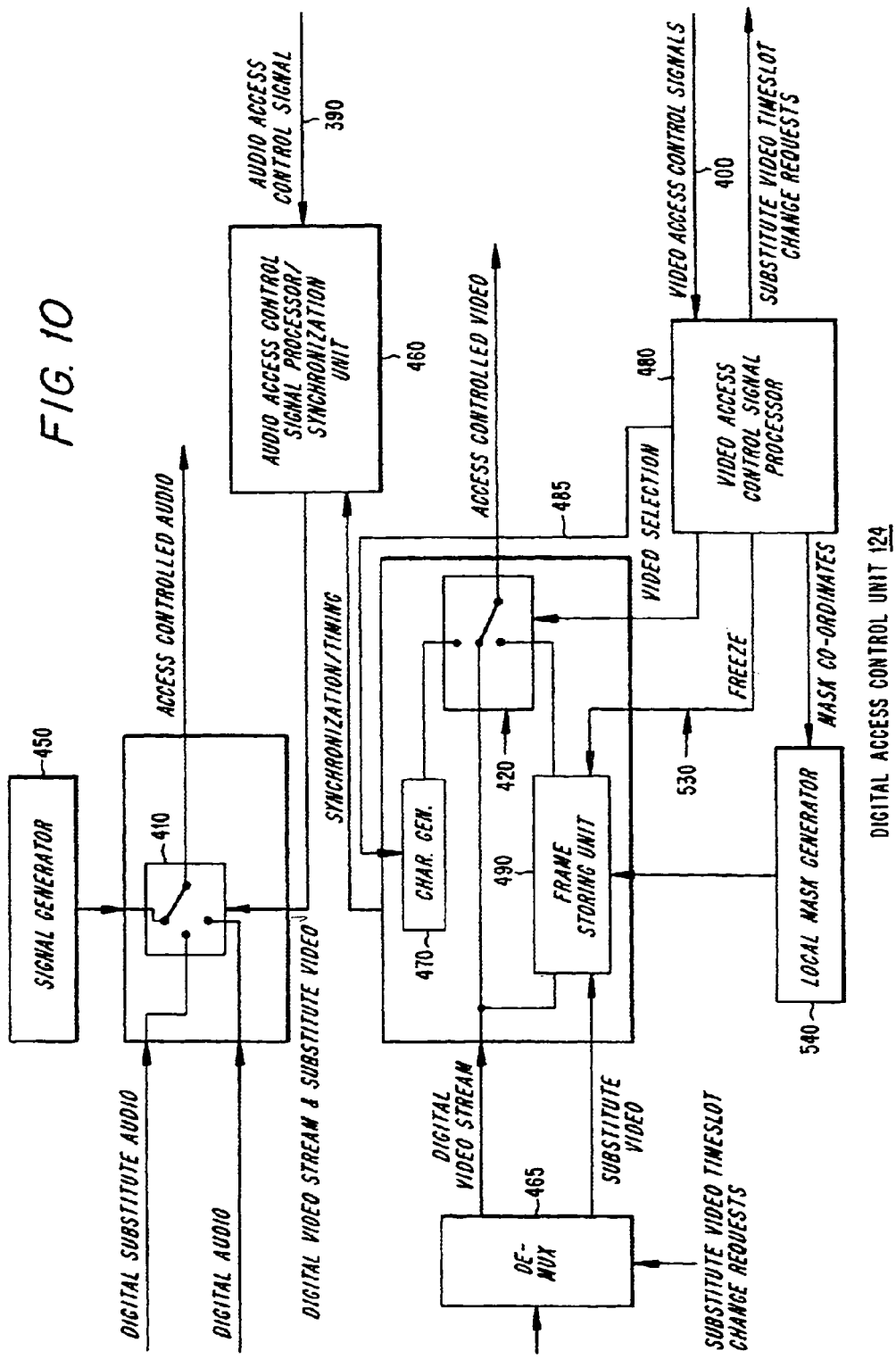
FIG. 10 is an exemplary digital version of the access control unit shown in FIG. 1.

An exemplary analog access control unit 122 is shown in FIG. 9, and an exemplary digital access control unit 124 is shown in FIG. 10. The access control unit receives audio and video access control signals 390 and 400 from the label interpretation unit 110 and uses these signals to control access to the audio and video program signals and substitute signals received from the demodulator with an audio access control signal processor 460 and a video access control signal processor 480. The audio and video access control signals 390 and 400 preferably include access instructions for the access control unit 120. The audio and video access control signals 390 and 400 are generated in the label interpretation unit 110 in accordance with the audio and video access processing instructions contained in the transmitted information label TIL. The audio access control signal processor 460 preferably includes an audio access synchronization unit to synchronize the switch 410 according to the timing of the video signal and instructions in the audio access control signal 390. A switch 420 is provided to control access to the video signals.

The audio access control signal processor 460 examines the audio access control signal 390 received from the label information processor 380 and interprets the instructions contained in the audio opcode of the TIL. For example, the audio access control signal processor 460 may be instructed by the audio access control signal 390 to bleep out a word with tone of 1000 Hz starting at line 200 for 15000 lines. The audio access control signal processor 460 would then carry out this function as required. Similarly the video access control signal processor 480 interprets the video access control signal 400 and performs the instructions contained in the video opcode of the TIL, e.g., rectangular mask from pixel 20,100 to 300,125.

According to one embodiment, the audio and video access control signals 390 and 400 instruct the audio and video access control signal processors 460 and 480 of the access control unit 120 to block transmission of the audio or video program signals when the transmitted category label exceeds the local category label. Thus, as shown in FIGS. 9 and 10, switches 410 and 420 are provided in the access control unit which are opened and closed in accordance with the audio and video access control signals 390 and 400 received from the label interpretation unit 110. The access control unit thus controls access to the audio and video program signals based on a comparison of the transmitted information label TIL and the local information label LIL. For example, if only the video category label is acceptable, as defined in the local information label LIL, the video portion of the program, but not the audio portion, is enabled so that the viewer is presented with only the video portion of the program. The audio and video category labels can thus be used to independently limit access by the viewer to the received audio and video program signals. The audio and video category labels can change with any frame, so that enabling of either signal is carried out at different times during the program depending on the transmitted audio and video category labels.

Because the received video signal preferably contains audio and video category labels in each vertical retrace interval or at an appropriate location in a digital video stream, the invention provides for the denial of access to only selected portions of a program. For example, in a program containing only a small amount of objectionable audio content, access can be denied only as to the objectionable audio content while access to the remainder of the program is allowed. In this way, only the objectionable material is blocked, rather than the entire program being blocked. The invention also allows for the resumption of the presentation of audio and video signals during the program to the viewer after the offensive or undesirable material has been blocked, because the label interpretation unit 110 can continually monitor the transmitted audio and video category labels. Of course, the other types of category labels, such as the audio violence, video sexual content, or data category labels can be used in the same way to control access to the program signals.

Referring again to FIGS. 5 and 6, the access controlled audio and video signals can be output to a conventional modulator 130. The modulator 130 modulates a carrier signal of an appropriate carrier frequency with the audio and video signals and supplies the program signals in the form of a modulated carrier wave to the television antenna terminals for use by the viewer's television set in a conventional manner. Alternately, the access controlled audio and video signals may be transmitted directly without modulation.

In some circumstances, a user may desire to deny access to a particular channel on a long-term basis. This may be accomplished with the register 300 in the viewing control unit 100 which comprises a locked channel list. As with the local category labels, the locked channel list 300 may be set or changed by a user after entering the correct PIN. The controller 280 may access the locked channel list 300 and instruct the tuner 50 or program selector 60 not to tune or select any channels listed in the locked channel list 300. In an analog system, frequency denial may be implemented by programming the tuner (synthesizer) 50 to not tune selected frequencies. This technique may be advantageously used to block an entire channel for an extended period of time, for example a horror movie channel. In a digital environment, the controller 280 of the viewing control unit 100 sends appropriate instructions to the program selector 60 to avoid a particular time slot in the case of time division multiplexing (TDM) or a particular code in code division multiple access (CDMA).

According to further embodiments of the invention, various substituted audio and video signals can be provided to the viewer when the content of the transmitted audio and video signals is offensive or undesirable, as defined by the local information label LIL. As will be described in greater detail below, these substituted audio and video signals can either be generated locally in the viewer station equipment 20 or generated at the central station equipment 10 and transmitted to the viewer station equipment 20.

According to one embodiment as shown in FIGS. 9 and 10, the access control unit 120 can include conventional hardware for generating substituted audio signals which are output to the modulator 130 in place of the received audio signals when the transmitted audio category label in the transmitted information label TIL exceeds the acceptable audio category label as defined by the local audio category label in the local information label LIL. In FIGS. 9 and 10, an audio signal generator 450 is provided in the access control units. The audio signal generator 450 can be activated by the label interpretation unit 110 via the audio access control signal 390 through the switch 410 to output a suitable signal such as a tone signal when the transmitted audio category label exceeds the local audio category label. Thus, for example, obscene language can be "bleeped" out at appropriate times with the audio signal generator 450.

A conventional character generator 470 can be activated by the label interpretation unit 110 through the switch 420 when the transmitted video category label exceeds the local video category label. The character generator 470 can output a signal containing an appropriate message to be displayed on the viewer's TV screen as a substitute for offensive portions of the video signal. A signal representing the displayed characters can be specified in the audio and video access processing instructions of the transmitted information label TIL and can be sent to the character generator 470 via the video access control signal processing unit 480 on a line 485. The character generator 470 can also output, for example, a signal representing a standard slide or picture, which has been pre-stored in a memory of the character generator, to be displayed during offensive portions of the received video signal.

According to a further embodiment of the invention as shown in FIGS. 9 and 10, the access control unit includes a frame storing unit 490 for allowing a "freeze frame" function. The frame storing unit 490, as shown in greater detail in FIG. 11, includes a video memory 500, and in the case of an analog system, an analog to digital converter (ADC) 510 and a digital to analog converter (DAC) 520. In a digital system, the ADC and DAC are replaced with digital video interface units. The video memory 500, in conjunction with an input address generator 535 and a timing unit 555, stores the video signal as it is received. During an offensive scene, in accordance with the video access processing instructions of the TIL, when the transmitted video category label exceeds the local video category label, a freeze frame signal 530 may be sent by the video access control signal processor 480 to the input address generator 535 so that subsequently received video signals are not stored in the video memory 500. The label interpretation unit 110 also instructs the switch 420 to connect to the frame storing unit 490 which contains the last scene prior to the offensive scene. The video frame stored in the video memory 500 of the frame storing unit 490 is then refreshed on the video screen continuously as the output address generator 545 continues to generate output addresses for the data stored in the video memory 500. The frame storing unit 490 supplies the video signal to the modulator 130 for the duration of the offensive video signal. Therefore, the same still picture is seen by the viewer until a new video frame is supplied via the switch 420. In this way, the last scene is "frozen" when objectionable material is received. As will be appreciated by those skilled in the art, the "freeze frame" technique is used extensively, for example, in standard time base correctors (TBCs).

According to another embodiment, the program labeling station 30 in the central station equipment 10 includes a mask code generator 180 which generates a mask code signal defining a mask to be laid over offensive portions of a video screen. The mask can be in the shape of a circle, square, rectangle, or any other suitable shape. The mask code generator 180 generates a mask code signal defining the shape of the mask, the size of the mask, the coordinates of the mask on the TV screen at different points in time, and any other pertinent data. The coordinates and shape of the mask can be specified, for example, with the parameters contained in the video access processing instructions of the TIL, as shown in Table 1.

Figure 11:
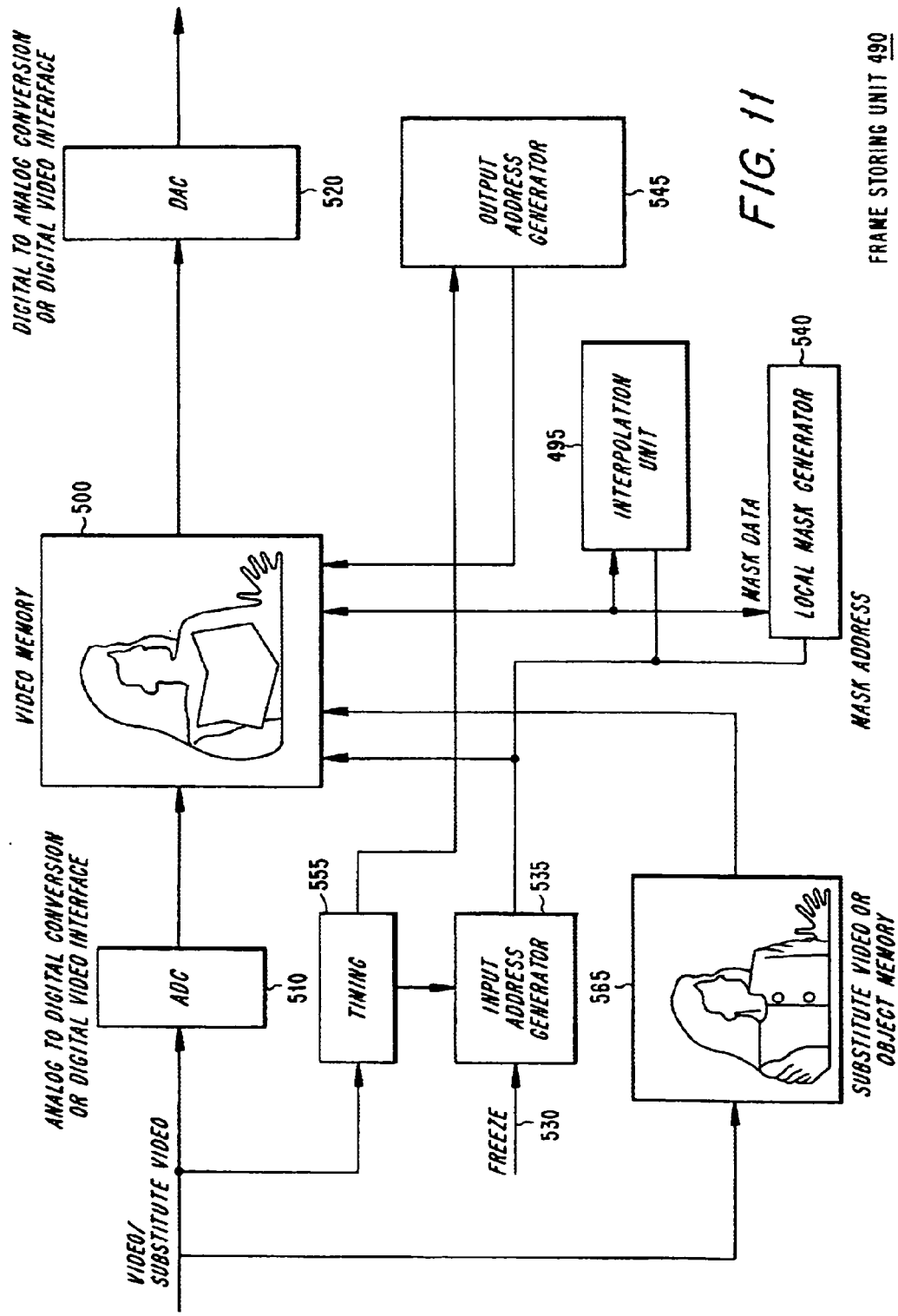
FIG. 11 is an exemplary embodiment of the frame storing unit shown in FIGS. 9 and 10.

In the viewer station equipment 20, the label interpretation unit 110 determines whether the transmitted video category label exceeds the allowable video category label as defined by the local video category label. If the transmitted video category label is acceptable, the video signal is passed to the modulator 130 unaltered. However, if the transmitted video category label exceeds the local video category label, the label interpretation unit 110 transmits an appropriate video access control signal 400 instructing the video access control signal processing unit 480 in the access control unit 120 to command a local mask generator 540 to insert the mask defined by the mask code signal of the TIL into the video signal before passing the video signal to the modulator 130. The local mask generator 540 generates mask data and a mask address which are sent to the video memory 500 in the frame storing unit 490 as shown in FIG. 11. In this way, only certain portions of a screen are blacked out, as opposed to the entire screen. For example, as shown in FIG. 11, a mask can be defined by the mask code generator 180 and transmitted in the TIL which blocks a portion of an image on a screen and moves with the image through the scene.

The local mask generator 540 may also be adapted to produce a blurring effect mask instead of a blacked out mask. As shown in FIG. 11, data from the video memory 500 may be sent to the local mask generator 540 which averages the video data and sends the averaged data back to the video memory 500, rather than sending a signal representing a blacked-out mask. The averaging of the video data produces a blurring effect which may be more aesthetically pleasing to a viewer than a blacked-out portion.

Figure 12:
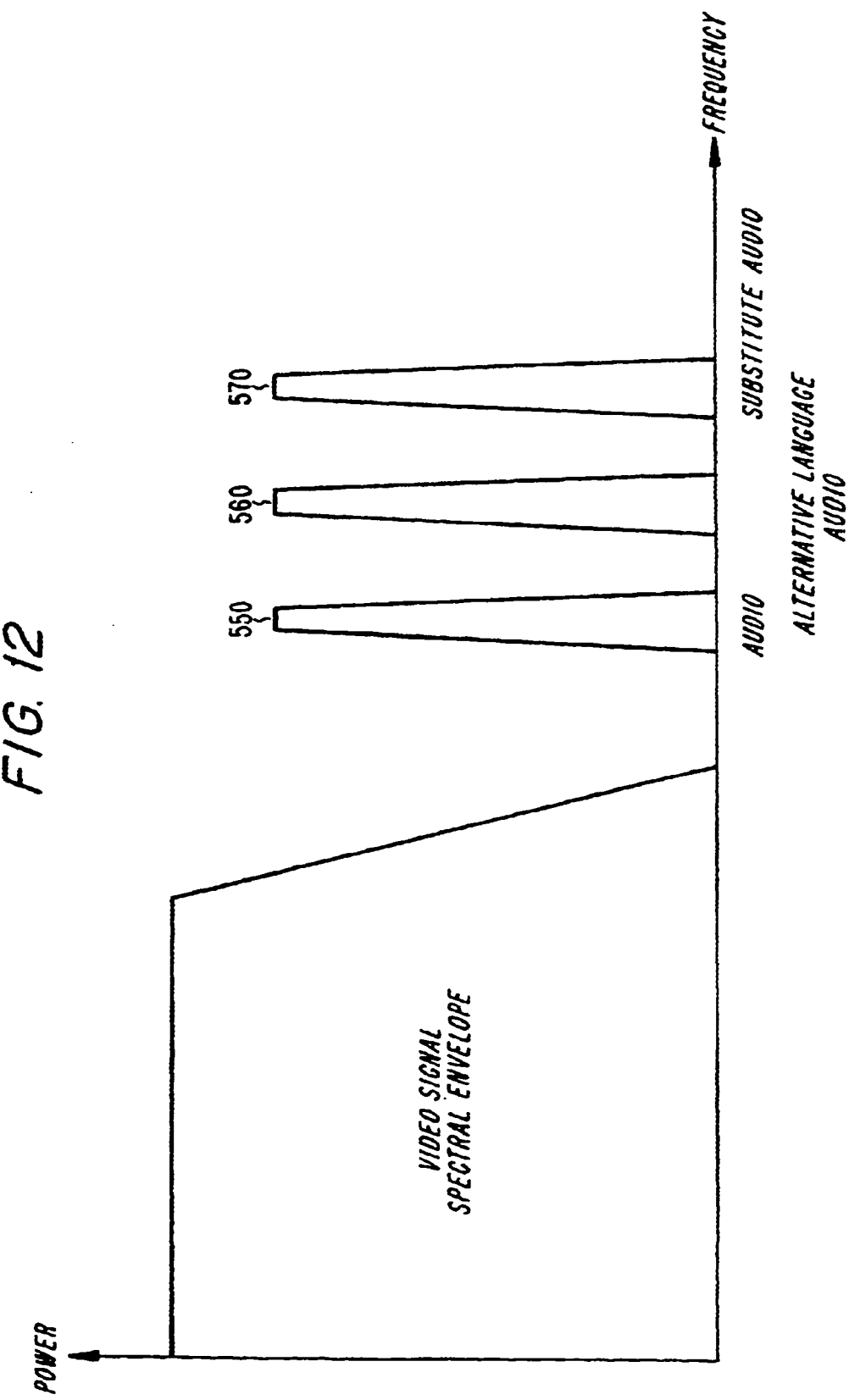
FIG. 12 is a diagram of a method for the transmission of substitute audio signals in an analog environment.

According to further embodiments of the invention, substituted audio, and/or video, and/or data signals can be transmitted to the viewer station equipment 20 from the central station equipment 10 which, for example, replace the entire normal audio, video, and data signals or portions thereof. For example, as described in U.S. Pat. No. 4,410,911, entitled "Multiple Signal Transmission Method and System, Particularly for Television", which is hereby incorporated by reference, a plurality of audio signals other than the normal audio signal can be provided in the composite television signal within the portion of the band allocated to audio transmission. Commonly known as a Separate Audio Program (SAP), these other audio signals are displaced in carrier frequency from the normal audio signal carrier frequency, but the composite audio is within the 200–250 KHz band allotted for audio transmission in the frequency band of a single television channel. FIG. 12 shows one example of a method for transmitting substitute audio signals which may be implemented in an analog environment. The audio signals shown in FIG. 12 may include, for example, a regular audio signal 550, an alternative language audio signal 560, and a substitute audio signal 570. As described in the above referenced U.S. Pat. No. 4,410,911, a conventional audio selector may be provided, for example in the demodulator/decoder unit 80/90 of the viewer station equipment 20, for recovering the individual audio signals. The access control unit 120 of the viewer station 20 also includes a switch 410, synchronized with the video signal and the audio access control signal 390, for switching in the substitute audio signal at the appropriate times. For example, in accordance with the transmitted audio category label and the audio access processing instructions of the TIL, the substitute audio signal can be switched in as the access controlled audio signal when the transmitted audio category label exceeds the locally generated audio category label.

In this embodiment, the transmitted information label TIL preferably includes an additional audio category label for each substitute audio signal. Thus, the information label generator 170 will generate an audio category label for each audio signal being transmitted. The transmitted information label TIL may also include audio access processing instructions which identify the locations of the additional audio signals in the transmitted information signal and which instruct the access control unit 120 to transmit to the viewer the audio signal having the highest acceptable rating, for example.

In the viewer station equipment 20, the label interpretation unit 110 compares the transmitted audio category label with the locally generated audio category label, and instructs the switch 410 to select the audio signal having the highest audio category label which does not exceed the locally generated audio category label. The switch 410 may thus include as many contacts as appropriate for the number of substitute audio signals. The selected audio signal is then transmitted to the modulator 130.

According to further embodiments of the invention, a substituted audio signal can be inserted into the video signal. A substitute audio signal can be compressed and inserted, for example, into the vertical retrace interval of an analog video signal along with the transmitted information label TIL, or in a digital system, in any appropriate location in the digital video stream. Thus, the signal combiner 260 of the central station equipment 10 receives the substitute audio signal and inserts the substitute audio signal into the video signal in a conventional manner. An additional audio category label which defines the content of the substitute audio signal, and audio access processing instructions defining the location of the substitute audio signal within the video signal, are also generated by the information label generator 170 and inserted into the video signal within the information label TIL. The substitute audio signal in the vertical retrace interval can be extracted from the video signal by the data receiver 85, decompressed, and stored for playback at the appropriate time, in accordance with the audio access processing instructions. Alternatively in a digital implementation the substitute audio is demultiplexed from the data stream.

Figure 13:
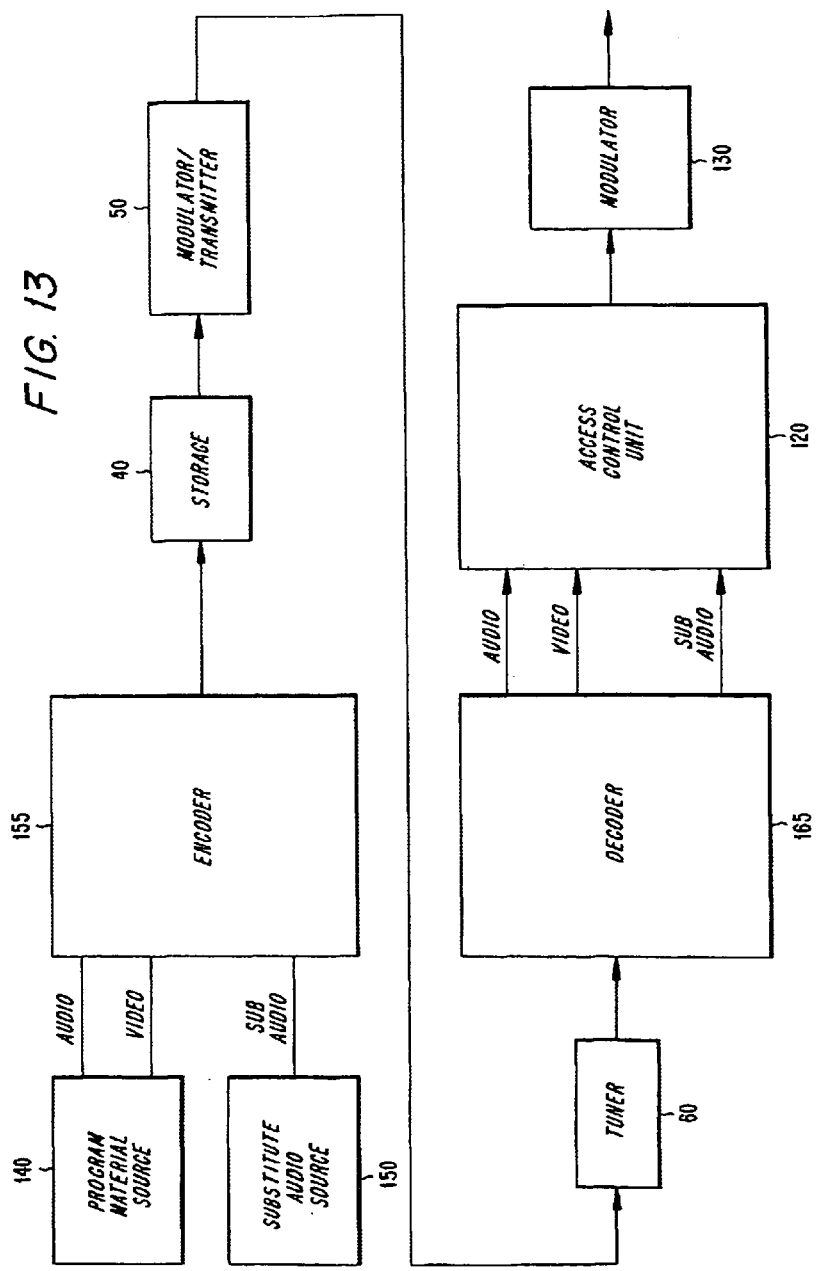
FIG. 13 is an exemplary apparatus for the transmission of substitute audio signals.

According to a further embodiment of the invention, an additional audio signal is generated by the substitute source 150 and transmitted to an encoder 155 as shown in FIG. 13, which inserts the additional audio signal in place of one or more of the standard 525 lines of the video signal. For example, as described in U.S. Pat. No. 5,130,815, entitled "Method and Apparatus for Encoding a Video Signal Having Multi-Language Capabilities", which is hereby incorporated by reference, a pre-selected number of scan lines located at the top or bottom portion of the video picture can be used to store audio information. One or more scan lines can be dedicated to each substitute audio channel. As shown in FIG. 13, the encoder 155 is provided to insert the substitute audio signal into the top or bottom scan lines of the video signal at the appropriate time. The modified video signal output from the encoder 155 can be an NTSC compatible signal containing time division multiplexed audio channels. The modified video signal is transmitted to the viewer station equipment 20 where the audio signals are recovered using a decoder 165.

The decoder 165 recovers the substitute audio signal by sending the modified video signal at the appropriate time to an analog to digital converter in the decoder 165 which converts the substitute audio signal to a digital format. The digital substitute audio is subsequently stored and then converted into analog format after which it is transmitted to the viewer. The decoder 165 may also include a line blanking device to insert a null signal into those portions of the video signal where the audio information has been overwritten. When the video picture is displayed, this portion of the signal will appear to be a black line.

The information label generator 170 in the central station equipment 10 preferably generates an audio category label for each substitute audio signal, and the labels are received by the label interpretation unit 110. The information label generator 170 also generates appropriate access processing instructions which identify the location of the substitute audio signals within the video lines so that the substitute audio signals can be recovered. The label interpretation unit 110 instructs the access control unit 120 to transmit to the modulator 130 the audio signal having, for example, the greatest acceptable audio category label, as defined by the locally generated audio category label.

As will be appreciated by those skilled in the art, various interpolation techniques have been devised which allow for a reconstruction of the video signal using less than all of its 525 lines. Such interpolation techniques are useful, for example when the transmission of addition information requires more lines of video than those at the top or bottom portions of the video picture, as described above. The lines in the video signal which are replaced by the additional audio signal may then be reconstructed using known methods of line interpolation. For example, in accordance with appropriate instructions provided by the video access processing instructions of the TIL, the frame storing unit 490 of the access control unit 120 can be used for interpolation to replace a missing line of video. As shown in FIG. 11, an interpolation unit 495 can be provided to read two lines of the video signal adjacent to the missing line, calculate an average brightness and color of adjacent elements in the two lines, and overwrite the missing line in the video memory 500 with the average values.

Exemplary embodiments of the invention in which a substituted video signal is transmitted to the viewer station equipment 20 will now be described. According to one embodiment, a first video signal occupies the odd-numbered lines in the 525-line video signal, and a second video signal occupies the even-numbered lines in the 525-line video signal. Through known interpolation techniques as described above, either one of the video signals can be reconstructed for presentation to the viewer. The video access processing instructions in the TIL may thus contain appropriate instructions which direct the access control unit 120 to transmit the interpolated even or odd lines of the video signal. The video access processing instructions may be used for example to control the frame storing unit 490 to store in the video memory 500 the even lines of the video signal and an interpolation of the even lines of the video signal in place of the odd lines of the video signal. The interpolation may be accomplished in a conventional manner by averaging the color and intensity values of adjacent elements between even numbered lines. The interpolation unit 495 reads the even numbered lines in the video memory, calculates an average color and brightness value between elements in adjacent even-numbered lines, and writes the calculated average value over the existing odd-numbered line. The program code generator 170 in the central station equipment 10 generates an appropriate video category code for each video signal, so that the code interpretation unit 110 can instruct the access control unit 120 as to which video signal to interpolate and transmit.

Figure 14:
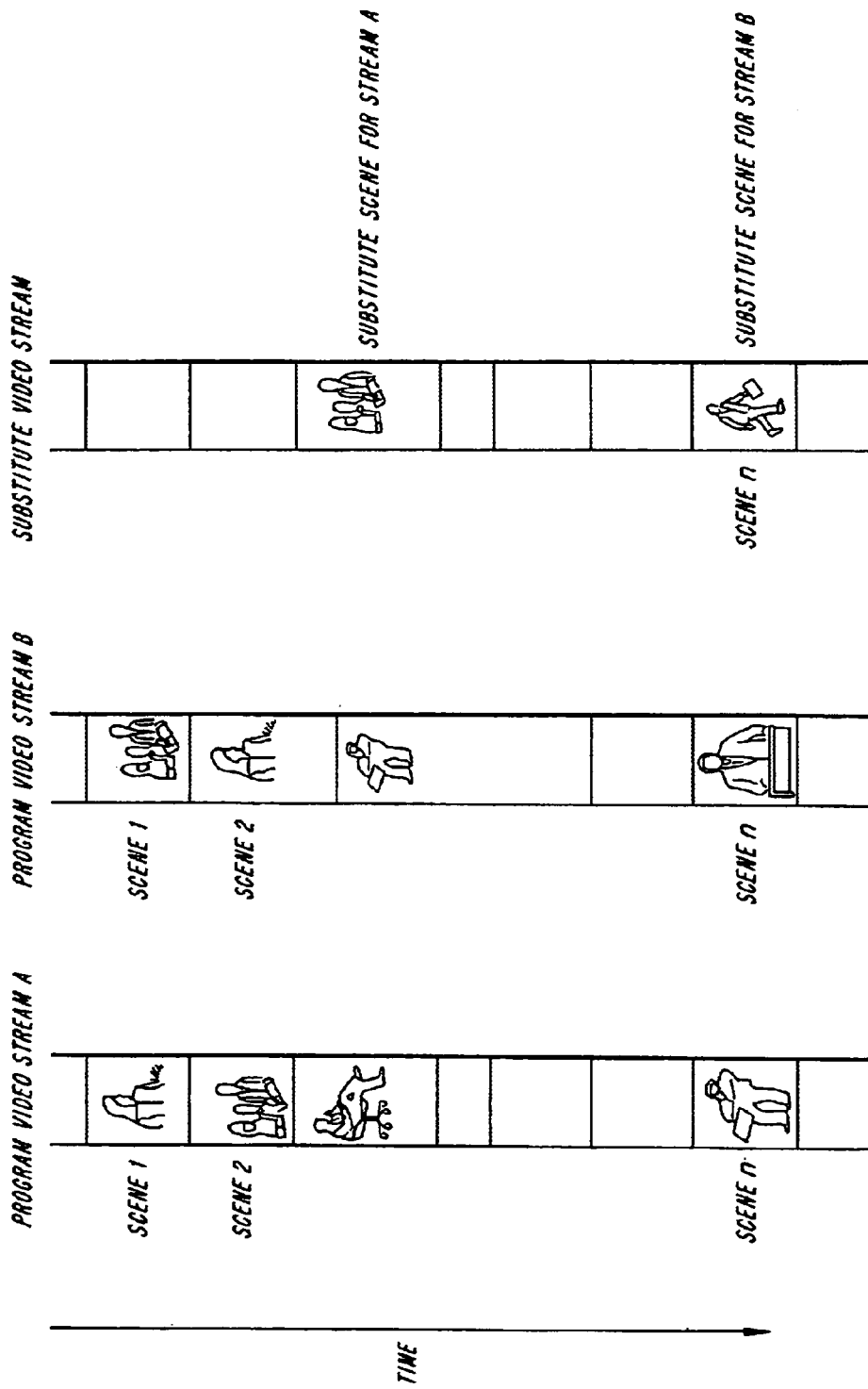
FIG. 14 is a diagram showing a substitute video stream which provides substitute signals for program video streams A and B.

According to a further embodiment, one or more dedicated channels are provided for transmitting a substitute video signal. As shown in FIG. 14, a substitute video stream may be provided which contains substitute video signals for one or more programs. In FIG. 14, the substitute video stream contains substitute video signals for program video streams A and B. In an analog environment, the substitute video stream is ordinarily provided on an additional frequency channel. In a digital system, the substitute video stream is preferably transmitted in a different time slot on the same frequency as the program video stream or streams, so that no frequency switching is necessary. However, it is of course possible to transmit the substitute video stream in a digital system on a different frequency. The substitute video stream preferably contains substitute video signals for an appropriate number of program signals such that no two of the program video streams A or B require substitute video signals simultaneously.

As shown in FIG. 5, to access the substitute video stream in an analog system, the access control unit 122, following the video access control signals from the label interpretation unit 110, sends a substitution frequency change request to the viewing control unit 100, which instructs the tuner 50 via a frequency control signal to tune to the frequency of the substitute video stream. The substitute video stream is then transmitted to the viewer. The substitute video stream is preferably part of an entire television channel including an audio signal and appropriate program labels. In this way, the program labels of the substitute signal are used to direct the tuner 50 to tune to the regular program channel when the required substitution has ended.

The substitution may occur when, according to the video access processing instructions, the transmitted video category label exceeds the local video category label. The substitute video stream is preferably rated at the lowest rating such as "G" so that only one substitute video stream is necessary. However, it is of course possible to provide many substitute video streams at different ratings such as "PG" and "R" so that the substitute video signal will be rated as high as possible without exceeding the rating specified in the local video category label.

In a digital television system, the video signal may be transmitted in a time slot within a time frame using conventional Time Division Multiplexing (TDM) or Time Division Multiple Access (TDMA) techniques, for example. Thus, the substitute video signal preferably resides within a second time slot on the same frequency channel, so that it is not necessary to tune to a different frequency channel to obtain the substituted video signal. As shown in FIG. 10, the video access control signal processor 480, as directed by the video access processing instructions, sends a substitute video time slot change request to the de-multiplexer 465 which accordingly transmits the appropriate time slot as the digital video stream. The substitute video stream may be processed in the frame storing unit 490 with the substitute video memory 565, which includes an appropriate timing unit and address generator, not shown in FIG. 11 for simplicity.

In either the analog or the digital system, the transmitted information label TIL preferably includes an additional video category label for the substitute video signal, as well as information which identifies the time slot in which the substitute video signal is located. The label interpretation unit 110 may direct the access control unit 120 to transmit to the viewer the video signal having the highest acceptable video category label as defined by the local video category label.

According to a further embodiment of the invention, substitute audio and video signals can be transmitted in the unused spectrum of the transmitted program signal. It is well known that less bandwidth is used during some portions of a transmission than during other portions of the transmission. For example, in digital transmissions, less bandwidth is used to transmit dark scenes than bright ones and less bandwidth is used to transmit voice than music. As will be appreciated by those skilled in the art, currently available compressed digital technology can put enough data for 10 or more channels in the bandwidth used for a single analog TV channel. The excess capacity of these systems may be used to transmit substitute audio or video signals synchronously with the original material or in advance to be stored at the user location in a substitute video memory 565 and clocked out of the substitute video memory 565 memory at the appropriate time as substitute audio and/or video.

Those skilled in the art will appreciate that, in addition to time division multiplexing, many other well known transmission techniques may be implemented in conjunction with the present invention to transmit and recover the program signals and substitute program signals. For example, Direct Sequence Spread Spectrum uses codes to separate information, and Frequency Hopping Spread Spectrum uses an instantaneous frequency location which is continuously changing to differentiate between information signals. Several spatial means of differentiating signals are also known in the art. Thus, the substitute program signals may be sent from different locations (space diversity) or with different polarities and later separated based on the transmission method. For example, the substitute program signal can be transmitted on the same frequency as the regular program signal, but at a different antenna polarity. As will be appreciated by those skilled in the art, satellite transmissions often use horizontal and vertical polarity to permit the transmission of two signals on the same frequency. According to another embodiment, the substitute signals are transmitted on the same frequency but at another phase. Quadrature phase modulation, for example, provides two signals on the same frequency but the phase of one is 90 degrees to the other. These signals can be detected separately. Various known data compression methods can also be used to compress the program signal and the substitute program signal so that they both can be transmitted in the space allocated for the program signal. Time spreading techniques, also known as Spread Time Code Division Multiple Access, and as described in U.S. Pat. No. 5,101,432, entitled "Signal Encryption," which is hereby incorporated by reference, can be used for transmission and recovery of the program signals and substitute program signals. All of the above mentioned techniques can be implemented in conjunction with the present invention to send and recover the program signals and substitute program signals, as will be appreciated by those skilled in the art.

From the foregoing description, it will be apparent that exemplary embodiments of the invention provide the user with a great degree of control over the extent and type of information which may be accessed. With the transmission of substitute audio and video signals the user may also tailor received program signals to his or her individual tastes. A particularly suitable application for the present invention is with movies which have been produced in different versions. Motion picture producers frequently cut movies differently depending on the culture of the viewing audience. For example, movies are cut differently for US theatrical release, network television, Pay-TV, and airlines, as well as for European, Far East, Middle East, and Latin American markets. With the present invention, a user may select a particular film and control the content or version of the film based on the local category labels. Thus, the viewers benefit with the capability of making informed choices based on the transmitted category labels in the TIL, and the producers and distributors gain by having a greater opportunity to provide what customers want.

Although the present invention has been described primarily in the context of television and movies, it should be understood that the invention can be implemented in any system in which a program is delivered to a viewer. Electronic books, for example, in which words are displayed on a screen or projected through a speaker present another advantageous application. A substitute program signal may be provided which comprises an alternate portion of a dialog. Stories can thus be tailored to the preferences of a particular user with the local category labels which are set with a suitable control unit. Instructional programs can be appropriately presented to a pupil based on experience-level using the local category labels. Program signals comprising data or data files may be labeled, substituted, and controlled using the LIL and the TIL or other appropriate labels and control units.

Musical recordings are another example of an application for the present invention. Songs which contain offensive lyrics may thus be recorded in different versions and labeled accordingly. The listener using an appropriate control unit can input local audio category labels so that offensive lyrics will be blocked or substituted with acceptable lyrics. The substitute lyrics can be stored on the same medium as the program signal, such as a single compact disc, so as to be easily accessible. In an embodiment in which the program labels are not transmitted by cable or broadcast techniques, but rather reside on a single storage medium with the program signal, the label may be more appropriately referred to as a "program information label" PIL rather than a transmitted information label TIL.

Other types of hardware may also be implemented in conjunction with the present invention. For example, the program, including all substitute signals, may be stored on a single CD ROM, video disk, video tape, audio tape, or video game cartridge. The user may designate appropriate local information labels which control access to the information contained in the storage device. Exemplary embodiments of the invention thus allow information producers to provide more useful products to consumers and allow consumers a great degree of protection and control over information products.

According to further embodiments of the invention, the local information label LIL can be used to control the transmission of program signals from a central station. As shown in FIG. 1, the system may include a communication link 15, such as a telephone line, a line in a two-way cable system, or a return path in a radio communication system, by which the user can transmit the local information label LIL from the viewer station equipment 20 to the central station equipment 10. The central station equipment 10 preferably includes a label interpretation unit and an access control unit which process the code and program signals in a manner similar to that described above. The code interpretation unit, for example, determines whether the local category codes transmitted to the central station equipment 10 are less than the transmitted category codes within the program signal. The user can then be advised as to the availability of the chosen program in light of the user's local category labels. The customer can then decide if he/she wants to view the program and whether masking should be used. In addition, if the program has different versions, or has substitute audio and video signals, the particular program to be provided to the user can be determined by the local category labels. This embodiment may eliminate the need to send substitute signals to the viewer station equipment 20. It is particularly suited, for example, to a "video on demand" system in which each user has its own allocated channel.

According to another aspect of the present invention, a menu of programs can be presented to a user in accordance with the user's individual preferences. In many systems, a great number of programs are available to users at a particular time. Because so many programs are available, it may be time-consuming for a user to browse all programs before choosing one. Accordingly, the program menu signal, which may be transmitted to the viewer station equipment 20 on a designated channel, may include for each listed program, the transmitted information label TIL of each program, including, for example, the transmitted rating profile label which specifies the percentage of time during the program that the program is rated at various ratings. In the viewer station equipment 20, the TIL is compared with the LIL. Based on this comparison, only programs which comply with the LIL are listed on the menu presented to the viewer. By way of example, a user may specify in the LIL "musicals" and a particular actor to obtain a menu listing all available musicals in which the specified actor appears. The user may also specify in the local rating profile label the tolerable percentages of time at which a program may be rated at specified ratings, so that non-complying programs do not appear in the menu presented to the viewer. The acceptable programs are then listed on the screen and may be numbered sequentially 1, 2, 3, or in any other desired order, so that the user may select which programs to view or schedule for viewing at a later time by entering the appropriate number.

According to further embodiments of the invention, methods and systems are provided to assist the user in forming and selecting the local information label (LIL).

The LIL can include a large number of category labels which identify many different aspects of the program. Although a large number of category labels provides significant flexibility in labeling and controlling program information, it also may make the task of setting up the LIL difficult or cumbersome for a user. For example, a user may not have a clear understanding as to the meaning of each category label of the LIL or how each category label corresponds to the content of the program signal. The user may also find it cumbersome to evaluate and choose the level of blocking or substitution for each category label of the LIL if there are many such category labels.

To facilitate the formation of the LIL, according to one aspect of the invention, the category labels which make up the LIL and the transmitted information label (TIL) or program information label (PIL) are each identified by "standardized descriptions". The standardized descriptions are short, consumer-understandable descriptive phrases which describe particular types of program content and which are preferably recognized as an industry standard. Both frame specific information labels and general information labels can be described by standardized descriptions. Each standardized description has an amplitude value associated with it which identifies a level of the program content described by that standardized description. The standardized descriptions provide a uniform classification system which can be used consistently by different programmers or rating boards. The standardization of the descriptions also makes it easier for users to learn how the standardized descriptions and associated amplitude values correspond to the content of the programs they are watching.

Standardized descriptions may be adopted to describe different types of program content of the program signal or signals (e.g., audio and/or video) such as "violence", "sensuality", "drug abuse", "horror or frightening scenes", "foul language", etc. In addition, standardized descriptions may be adopted to further divide the above categories into sub-categories. For example, violent program content can be subcategorized with the following standardized descriptions: "violence of war", "police violence", "comedic violence", "animated character violence", "medieval violence", "torture", "man/woman violence", "sexual violence", etc. Standardized descriptions can also be provided to subcategorize other categories such as "sensuality", "drug abuse", "horror or frightening scenes", "foul language", etc.

Because the descriptions of the program content are standardized, the establishment of a rating system is simplified. For example, a rating board, rather than having to make value judgments as to which programs should be rated "R", "PG-13", "G", etc., simply labels the instantaneous content of the program according to the standardized descriptions and allows the consumer to decide which programs are acceptable. Some scenes may exhibit multiple categories. For example, a scene may be sensual, sexually violent, and have foul language. The standardized descriptions allow the rating board to provide the consumer with a detailed yet understandable description of the content of the program without having to make value judgments as to what programs are acceptable for which groups of people.

In addition, users have more control over the processing of received information because they are able to evaluate its content in detail through the standardized descriptions without having to be exposed to it. For example, because violent programs may be subcategorized into many different subcategories, a user is able to block certain specific types of violent program material, such as torture or sexual violence, without being exposed to the program material.

In effect the program suppliers indicate that a particular program or scene has, for example, a small amount of "frontal female nudity", a lot of "medieval torture" or a moderate amount of "comedic animated character violence", and the viewer decides if that is something they want blocked for themselves or their children. And if so, at what blocking level. The consumer designs his or her own rating system using the standardized descriptions provided by the industry to describe various issues.

The standardized descriptions may be used by a programmer or rating board to form the TIL. The TIL preferably has a suitable number of bits allocated to store amplitude values associated with each standardized description. For example, the TIL may have three bits allocated to store an amplitude value associated with the standardized description "animated character violence". The amplitude value may range from zero to seven, for example, to identify the degree of animated character violence at a particular point in the program or to identify the overall level of animated character violence. The rating board labels the instantaneous and/or overall content of the program signal by assigning amplitude values to each standardized description. The assigned amplitude values, together with other codes such as identification codes, make up the TIL.

Viewers use the standardized descriptions in forming the LIL. The LIL preferably includes a corresponding number of bits for each standardized description in the TIL to allow the user to select a desired level of program content described by each standardized description.

The content of the program can thus be characterized in detail with the amplitude values in the TIL associated with each standardized description. Furthermore, because the standardized descriptions are easily understandable by a user, the user is able to block certain types of objectionable program material with a high degree of control and without initially being exposed to the program material.

In the event that the standardized descriptions are revised, the updated standardized descriptions can be provided to a user by transmitting them with the program signal, for example in the vertical blanking interval or at another suitable location. This allows the standardized descriptions to be periodically updated and allows for the addition of new standardized descriptions in the future.

According to another embodiment of the invention, a method is provided to assist the user in selecting an amplitude value for each category label in the LIL. According to the method, a program may be implemented by the controller 280 of the viewing control unit 100 in which the user station equipment 20 provides information to the user about each category label in the LIL and then prompts the user to input an amplitude value for each of the category labels in response to the information provided. As shown in FIG. 7, the information provided to the user about each category label can be stored in a conventional memory device 281 such as an audio or video tape or disc. The memory 281 may be a portable device so that an updated version of the information provided to the user about each category label can be provided to the user on a new tape or disc.

In addition, the memory 281 may be configured such that updated information about each category label may be received at the viewer station equipment 22 with the program signal and written into the memory 281. For example, in the event that one or more category labels are modified or added, the updated information relating to the modified or added category labels may be transmitted to the user with the program signal to be stored in the memory 281. The updated information may then be provided to the user by the controller 280 and the user may be prompted to input a new amplitude value for the category label in response to the updated information provided.

The viewing control unit 100 may include an audio/video generator 282 which generates a signal based on the information about each category label stored in the memory 281. The signal may be a textual or verbal explanation, such as a standardized description, which is presented to the viewer via audio, video or both. The viewing control unit 100 using its audio/video generator 282 may then prompt the user to input a desired amplitude value from zero through seven. The steps of providing information to the user and prompting the user for a response can be carried out alternately for each of the category labels.

Before or after receiving the user's inputs for the category labels, the viewing control unit 100 may prompt the user to identify a person associated with the LIL being formed. The user may input an appropriate identification code which identifies the person associated with the LIL. The viewing control unit 100 forms the LIL based on the user's input category labels and identification code. The LIL may be stored in the category registers 290. A desired LIL may be activated at a later time by inputting the appropriate identification code.

The category registers 290 may comprise a portable storage medium such as a tape or disc, or preferably, a "smart card", or memory card, which stores one or more LILs. The portability of the category registers allows a user to use his or her LIL at various locations away from home, such as on airplanes, at other user's houses, etc.

To further facilitate the user's formation of the LIL, information describing each category label, such as a standardized description, can be presented on the user's screen in connection with a graphical representation, such as a horizontal or vertical bar, or a pie chart, of the amplitude value associated with that category label. The user may set the amplitude value associated with each category label by increasing or decreasing with a standard remote control the length of a bar which represents the amplitude value associated with a particular category label. For example, the user may select the subcategory "torture" under the category "violence" and shorten the bar to level 1 or 2 so that most of the program material in this subcategory is blocked.

Typically, a household will have users of different ages or preferences. The viewing control unit 100 therefore preferably contains a sufficient amount of memory in the category registers 290 to store several LILs for different viewing audiences. Each LIL preferably includes an identification code which identifies the user or users to which the LIL pertains. In homes with no children, some users will want no blocking at all. Other users may want some degree of blocking and will store one LIL in the category registers 290. In homes with one child, users may desire one or two LILs, one LIL for the child and possibly one LIL for the adults. In homes with more than one child, especially where there is a substantial difference in age of the children, it may be desirable to store 3 or 4 LILs in the category registers 290 to individually control the types of program content which are presented to the various members of the household.

By forming and storing a unique LIL for each member of a household, it is possible to control the information presented by the user station 20 based on which member is watching. This may be accomplished, for example, by storing a unique LIL for each user in the category registers 290 of the viewing control unit 100, inputting an identification code by remote control to the viewing control unit 100, and having the controller 280 of the viewing control unit 100 activate the LIL associated with the user based on the input identification code. To ensure the integrity of the system, the identification code can be a code known only to the particular user so that a child cannot, for example, activate the LIL associated with his parent.

As shown in FIG. 7, and as described above, the viewing control unit 100 preferably includes a lock mechanism 310 which controls a user's ability to create or modify the LIL. The lock mechanism 310 can be used to allow a parent to control the formation and modification of LILs and to prevent children from forming or modifying an LIL. The various methods and systems described herein for forming or selecting an LIL can be regulated by the lock mechanism 310 such that only parents are able to form or modify LILs, while children may activate only their own LIL. The lock mechanism 310 may be unlocked by various means including a correct combination or PIN, or, as will be described further below, by various passive identification systems.

According to another embodiment of the invention, a unique LIL can be formed and stored for different combinations or groups of people. For example, an LIL may be formed for the situation where a 14 year old child views a program with at least one parent. In this situation, the parents may find it acceptable to set the amplitude values associated with the category labels to a higher level than those of the child's personal LIL which are activated when the child is alone.

To assist the user in forming the LIL for a particular combination of people, the controller 280, through the audio/video generator 282, may alternately provide information to the user describing each category label and then prompt the user to input a desired amplitude value. The controller 280 may then prompt the user to identify the combination of people associated with the LIL being formed. The controller 280 may store in the LIL the identification codes of each person in the combination. The appropriate LIL can be activated later by inputting the identification codes of the people in the combination.

An LIL for a combination of users can also be formed automatically by the viewing control unit 100, based on the LILs for the individuals in the combination. According to one exemplary method, the controller 280 scans the amplitude values for each category label in the LILs of each person in the combination. The controller 280 takes the lowest amplitude value found for each category label and forms the LIL for the combination based on the lowest amplitude values. In this way, no one in the combination is offended.

According to another exemplary method, the LIL for the combination of people is formed by averaging the LILs for each person in the combination. For example, if person A has set "animated character violence" to 6, person B has set "animated character violence" to 6 and person C has set "animated character violence" to 3, the LIL for the combination would be set to the average amplitude value of 5. This method represents a compromise and avoids the situation where one person in the combination lowers the amplitude values for everyone else in the combination.

According to yet another exemplary method, the LIL for the combination of people is formed based on whether there are minors in the combination. Because it may be desirable to put a limit on what is presented to a minor, an averaging technique, in which the minor's LIL is averaged with the LILs for those over 21, may not be appropriate. A hybrid method may therefore be implemented in which the LILs of only the minors in the combination are averaged to form the LIL for the combination, without factoring in the LILs for those 21 and over.

According to another embodiment, a plurality of LILs can be formed and stored in the category registers 290 which correspond to different ages of members of a household. For example, a unique LIL can be stored in the category registers 290 for ages 5, 12, 17, and over 21. To assist the user in forming the LIL for a particular age, the controller 280, through the video generator 282, may alternately provide information to the user describing each category label and then prompt the user to input a desired amplitude value. The controller 280 may then prompt the user to identify the age associated with the LIL being formed. The controller 280 stores a code identifying the age in the LIL. The appropriate LIL can be activated later by inputting the age of the user.

According to another embodiment, a plurality of default LILs can be formed and stored in the default memory 350 (FIG. 7) which correspond to different time periods during a day. For example, a unique default LIL can be formed for the hours of 3 pm–9 pm when younger children are at home and awake, 9 pm–11 pm when older children may be awake, and 11 pm–3 pm when only parents are likely to watch programs. To assist the user in forming the default LIL for a particular time of day, the controller 280 through the video generator 282, may prompt the user to identify the time of day associated with the default LIL being formed. The default LIL preferably includes a code which identifies the time period during which it is active. A timer in the controller 280 activates the appropriate default LIL based on the time of day. The default LIL may be overridden by entering the identification code of a user.

The task of forming an LIL or LILs can be further facilitated according to another embodiment of the invention. Rather than prompting the user to select amplitude values for each of a plurality of category labels in the LIL, a program can be implemented by the controller 280 in which the user station 20 presents a series of questions to the user which are directly or indirectly related to the category labels in the LIL. For example, the following questions may be presented by audio or video to the user:

"How many children are in the house?";

"What are the ages of members of the household?";

"What is a typical age of visiting children?";

"Do you consider yourself religious" Answer (0 to 7)

"At what point does a sex scene become offensive to you" Answer (0 to 7); etc. The questions are preferably phrased so that the user can input his or her answers either in a numerical format or in a yes/no format. Using conventional methods for determining a psychological profile based on such questions, the controller 280 may correlate the user's answers to specific amplitude values for each of the category labels in the LIL. For example, a control group of users may be assembled to correlate answers to the questions with the amplitude values for each category label. The test control group first answers the questions and then assigns amplitude values for each category label. A correlation routine is then developed, based on the responses of the control group, to correlate answers to the questions with the amplitude values for each category label.

The correlation routine is later implemented by the controller 280 to assign amplitude values to each category label in the LIL based on the user's answers to the questions. Preferably the correlation routine is stored in a memory such that it can be updated periodically. The correlation routine may be modified periodically by a rating board, and the updated correlation routine may be provided to the user by, for example, transmitting the updated routine with the program signal to be written over the previous routine, or by providing the user with a new disc or tape containing the updated routine.

Preferably, the viewing control unit 100 displays the category labels and associated amplitude values during the process of forming the LIL so that the user can modify the amplitude values set by the controller 280, if desired. This method can be used to form unique LILs for different individuals, groups of individuals, or time periods during the day.

According to a further embodiment of the invention, the TIL can be used to anticipate the user's preferences in programming. The controller 280 in the viewing control unit 100 may be programmed to record pertinent information about the programs which a particular viewer watches. The viewing control unit 100 may thus include a memory 283 (FIG. 7) which stores, for each program watched, the user or users who are watching the program as well as some or all of the category label amplitude values contained in the TIL for that program. As shown in FIG. 6, the TIL received by the label interpretation unit 110 may be forwarded to the viewing control unit 100 for this purpose. FIG. 7 shows that the controller 280 of the viewing control unit 100 receives the TIL from the label interpretation unit 110 and stores the TIL in the memory 283.

The viewing control unit 100 will thus heuristically compile a viewing history for each of the users in the household. For example, the viewing control unit 100 may record TIL category label amplitude values which indicate that a first user typically views programs with a low level of violence of all kinds and that a second user watches programs with a high level of war violence content. This information may be used in connection with a menu system or viewing guide to identify programs the viewer is more likely to enjoy. This feature can be enhanced by giving the viewer an opportunity to express his or her level of enjoyment of programs viewed. If they really enjoy a program, the viewer can give it a high "enjoyment rating", and if the program was not enjoyable, a low enjoyment rating. The enjoyment rating may be combined with other heuristic information to further refine the ability of the system to anticipate viewers' desires. For example, the controller 280 may be programmed to present to the user a menu which includes programs selected based on the user's viewing history as well as on the user's input enjoyment ratings for programs watched in the past.

Viewing history can also be used in conjunction with a menu system for different combinations of people or for different times during the day. For example, the viewing control unit 100 may compile a viewing history for each user at different times of the day. The viewing control unit 100 may thus record the time of day that a program is watched along with the TIL of the watched program and the identification code(s) of the user(s) watching the program.

According to a further embodiment of the invention, the user may create an LIL or modify an existing LIL while a program is being viewed. In this embodiment, the amplitude values may be decreased or increased by the user of the remote control. The user may designate such changes to be temporary or to permanently change the LIL. Standard remote control channel UP/DOWN buttons or audio amplitude buttons may be used in connection with a special category button, or a separate category UP/DOWN button may be added to the remote control. At the option of the viewer, some or all the category labels in the TIL may be displayed graphically at the bottom of the user's screen as the program is presented. The amplitude values may be displayed for each category label in the TIL, for example, by displaying a standardized description for each category label adjacent to a graphical representation of its associated amplitude value.

As an alternative to using a remote control device for data entry, a "voice entry" system may be used to enter data. Voice entry systems are generally divided into "speaker dependent" systems, which learn to recognize particular voices, and "speaker independent" systems which recognize virtually any voice. Voice entry systems may also be designed to recognize commands or to recognize continuous speech. Preferably, a voice entry system used in conjunction with exemplary embodiments of the present invention recognizes the particular person speaking as well as the command spoken by that person. The ability to identify a user through voice recognition also allows the system to control access to or modification of the LIL based on which user is speaking. For example, the system can simultaneously identify the users present as well as allow authorized adults to control the LIL to a greater extent than the children present.

When material which is objectionable to the user is presented, the user may indicate with a remote control device or by voice entry that a particular category label in the LIL has an amplitude value which is too high. The controller 280 may respond by decreasing the amplitude value for that category label of the LIL so that it is less than the amplitude value associated with the corresponding category label in the TIL. In this way, the controller heuristically forms or modifies the LIL such that the objectionable material shown to the user will be subsequently blocked, since the category label in the LIL is reduced to be less than the corresponding category label in the TIL. Displaying the instantaneous amplitude values of the category labels in the TIL also allows the user to learn to correlate the amplitude values for the category labels with the program material presented to the user. In addition, the user may change the amplitude values associated with each category label in the LIL simply by entering a number with the remote control corresponding to the desired amplitude value as the program is being watched.

To further simplify the modification of the LIL for the user, the controller 280 can be programmed to automatically reset particular category labels in the LIL if the user indicates generally that the program is objectionable. For example, rather than having the user indicate which particular category label is set too high, the controller may simply reduce the category label amplitude value in the LIL which is closest in value to the corresponding category label amplitude value of the TIL to a value which is less than the corresponding category label amplitude value of the TIL. In this way, the program is subsequently blocked while the LIL is modified as little as possible, and the user may indicate generally that the program is offensive without having to point to a specific category label.

If one or more category labels in the user's LIL are set too low such that a program is blocked against the wishes of the user, the user may override the appropriate category labels by inputting a higher value. For example, if the category label amplitude value in the TIL for "police violence" is "4", and the corresponding category label amplitude value in the LIL is "3", the user may override the blocking or substitution by inputting an amplitude value of "4" or above.

Alternately, the controller 280 may be programmed to increase any category label amplitude value in the LIL, when commanded by the user, to an amplitude value which would allow the program to be presented without blocking. For example, if the user's category label amplitude values for "brutality" and "medieval violence" are set too low to allow the program to be presented, the controller 280 may increase these category label amplitude values to match the corresponding category label amplitude values in the TIL. The user may permanently reset the category label amplitude value or values by indicating that the subsequently presented material is acceptable. In this way, the controller 280 heuristically uses the actions of the user in resetting the category label amplitude values to update the user's LIL. Alternatively, the user may indicate that such changes are temporary and apply only to the program currently being watched.

Where more than one program signal is available, i.e., at least one substitute program signal is available, the user may be informed of the additional signal(s) by displaying the TIL category label amplitude values for each available program signal on the screen. This allows the user to select another program signal by modifying the appropriate category label amplitude values.

According to another embodiment of the invention, the LIL may be modified based on the TIL. It is well known that the context in which certain program material is presented may influence a user's tolerance of that program material. For example, a user may find violent acts very offensive when presented in a context in which the violence is glorified. On the other hand, the same user may have a much greater tolerance for the same violent acts if presented such that the violence is condemned. Thus, the TIL may include variable represented by a suitable number of bits to represent the context in which a violent act is presented. The variable is received by the controller 280 of the viewing control unit 100 which may then modify the LIL based on the variable. For example, if the variable indicates that the violent acts are condemned, the controller 280 may increase the appropriate category label amplitude value so that a greater degree of violent acts are presented to the user. Conversely, if the variable indicates that the violent acts are glorified, the controller 280 may decrease the appropriate category label amplitude value so that no violent acts are presented to the viewer. This method can of course be generalized to modify other category label amplitude values in the LIL based on variables in the TIL.

According to further embodiments of the invention, various methods and systems may be provided to automatically identify users in a room who are watching a program. Users can be identified, for example, by a personal identification number (PIN) entered with a remote control. In addition, more sophisticated passive systems may be implemented to identify users. For example, a heat signature or voice recognition may be used to identify the user. Or, a camera may be implemented to record the shape of a user's face which is then compared with face shapes stored in memory. Other physical attributes may be used to identify different users. For example, the relationship of key features such as eyes, nose, mouth, body size, shape and mass, eye blink rate, retina blood vessel pattern, fingerprint or capacitance (detected when touching remote control) may be used for identification of users. FIG. 7 shows that the passive identification system 286 provides input to the controller 280 to allow the controller 280 to activate the appropriate LIL based on the users detected by the passive identification system 286.

According to another aspect of the invention, the category labels in the TIL may be used in scheduling advertisements. Advertisers are, of course, concerned with the type of program during which their advertisements are aired. Some advertisers, for example, may wish to avoid presenting their advertisements during programs which contain any amount of sexual or violent material. Other advertisers, conversely, may wish to schedule their advertisements during these types of programs.

The category labels in the TIL identify certain types and levels of program content. Accordingly, a program may be implemented by a scheduler 41 in the central station equipment 10 (FIG. 2) to scan the category labels in the TIL of the particular program and to schedule advertisements based on the timing of certain levels of program content in the program. For this purpose, the scheduler 41 may include a conventional microprocessor or controller. By way of example, the controller in the scheduler 41 may be programmed to schedule a commercial of a particular advertiser within 5 minutes of an instance of sexual content which is above a certain level. Or, the scheduler 41 may be programmed to schedule a commercial of a different advertiser so that it is separated by at least 20 minutes from any sexual or violent program content above a certain level. The ability to schedule advertisements in this manner provides more control to advertisers in directing their commercials to certain audiences and in avoiding associations with material which they may feel is objectionable. For example, certain advertisers may not wish their products to be associated in any way with a program which has been rated as containing sexual or violent material above a certain level. Other advertisers may wish to target other audiences, for example, those viewers who do not disapprove of sexual or violent material.

The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims.

What is claimed is:

1. A method of forming a local information label, the local information label comprising at least one local category label which identifies a category of program content, said at least one local category label having an associated value which identifies an acceptable level of program content, the method comprising the steps of:

presenting a program to a user;

presenting to the user a representation of a transmitted category label having a value which identifies the content of the program;

receiving an indication from the user that the content of the program is at least one of unacceptable and acceptable;

modifying the value associated with the local category label based on the received indication from the user that the content of the program is at least one of unacceptable and acceptable;

forming the local information label based on the modified value associated with the local category label; and indicating whether the modification of the value associated with the local category label is to be temporary or permanent.

2. An apparatus for forming a local information label, the local information label comprising at least one local category label which identifies a category of program content, said at least one local category label having an associated value which identifies an acceptable level of program content, the apparatus comprising:

means for presenting a program to a user;

means for receiving an indication from the user that the content of the program is at least one of unacceptable and acceptable;

means for modifying the value associated with the local category label based on the received indication from the user that the content of the program is at least one of unacceptable or acceptable;

means for forming the local information label based on the modified value associated with the local category label; and means for indicating whether the modification of the value associated with the local category label is to be temporary or permanent.

* * * * *